(12) United States Patent
Bason et al.

(10) Patent No.: US 7,243,840 B2
(45) Date of Patent: Jul. 17, 2007

(54) SMART IDENTIFICATION DOCUMENT

(75) Inventors: Eli Bason, Kfar Saba (IL); Boaz Shuman, Yehud (IL); Igor Merling, Kfar Saba (IL); Eli Hassan, Hod Hasharon (IL); Ilan Kander, Raanana (IL)

(73) Assignee: On Track Innovations Ltd., Rosh Pina (IL)

( * ) Notice: Subject to any disclaimer, the term of this patent is extended or adjusted under 35 U.S.C. 154(b) by 35 days.

(21) Appl. No.: 11/010,382

(22) Filed: Dec. 14, 2004

(65) Prior Publication Data

US 2005/0274794 A1   Dec. 15, 2005

Related U.S. Application Data

(63) Continuation-in-part of application No. 10/864,353, filed on Jun. 10, 2004.

(51) Int. Cl.
*G06K 5/00* (2006.01)

(52) U.S. Cl. .................. 235/380; 235/375; 235/492

(58) Field of Classification Search ............. 235/380, 235/381, 375, 492, 486; 340/10.1, 10.2, 340/572.7
See application file for complete search history.

(56) References Cited

U.S. PATENT DOCUMENTS

| | | | |
|---|---|---|---|
| 5,291,560 A | 3/1994 | Daugman | |
| 5,363,453 A | 11/1994 | Gagne et al. | |
| 5,973,710 A | 10/1999 | Landman et al. | |
| 6,101,477 A | 8/2000 | Hohle et al. | |
| 6,108,022 A | 8/2000 | Landman et al. | |
| 6,121,544 A | 9/2000 | Petsinger | |
| 6,214,454 B1* | 4/2001 | Kanda et al. | ............. 428/294.7 |
| 6,219,439 B1 | 4/2001 | Burger | |
| 6,785,405 B2* | 8/2004 | Tuttle et al. | ................. 382/112 |
| 6,804,378 B2* | 10/2004 | Rhoads | ........................ 382/100 |
| 6,863,220 B2* | 3/2005 | Selker | ........................ 235/492 |
| 2002/0143588 A1 | 10/2002 | Ishigami et al. | |
| 2003/0057286 A1* | 3/2003 | Yamagishi et al. | .......... 235/492 |
| 2003/0093187 A1 | 5/2003 | Walker | |
| 2003/0099379 A1 | 5/2003 | Monk et al. | |
| 2003/0116630 A1 | 6/2003 | Carey et al. | |
| 2003/0117262 A1 | 6/2003 | Anderegg et al. | |
| 2003/0132301 A1 | 7/2003 | Selker | |
| 2003/0136828 A1* | 7/2003 | Takesada et al. | ............ 235/380 |
| 2003/0164611 A1 | 9/2003 | Schneider et al. | |
| 2003/0168514 A1* | 9/2003 | Rancien et al. | ............. 235/492 |
| 2004/0081332 A1 | 4/2004 | Tuttle et al. | |
| 2004/0124248 A1 | 7/2004 | Selker | |
| 2005/0128085 A1* | 6/2005 | Bon | ......................... 340/572.7 |
| 2005/0236489 A1* | 10/2005 | Droz | ........................... 235/487 |
| 2005/0242194 A1* | 11/2005 | Jones et al. | .................. 235/487 |

* cited by examiner

*Primary Examiner*—Ahshik Kim
(74) *Attorney, Agent, or Firm*—Mark M. Friedman

(57) ABSTRACT

A smart electronic personal identification document, including a smart identification module and an automated anti-skimming element. The smart identification module includes a contactless chip module and an antenna. The smart identification module is operative to store and exchange personal identification information contactlessly with an external reader. The automated anti-skimming element is configured for preventing unauthorized theft of the information.

8 Claims, 20 Drawing Sheets

Smart Passport Inlay 804
800
802
806

808
802

808
802

SMART IDENTIFICATION DOCUMENT

This application is a continuation-in-part of U.S. patent application Ser. No. 10/864,353 filed Jun. 10, 2004.

FIELD OF THE INVENTION

The present invention relates to tamper-free and forgery-proof identification documents, and in particular to smart passports.

BACKGROUND OF THE INVENTION

Security, particularly at major airports has become a significant concern. No printable identification is currently available to positively identify a passenger with high reliability. No means is currently available to transmit such information securely and to associate that information with user specific permissions All passengers entering the USA have been required to bring a Machine Readable Travel Document (MTRD), i.e. a machine-readable passport since October 2003. Starting October 2004, the passport is required to contain biometric data that uniquely identifies its bearer. This turns the passport into a "smart" passport, which comprises a contactless chip that stores the personal biometric information as digital information. The chip is accessed contactlessly by a reader that retrieves the biometric information and compares it with information stored in a database, to verify the identity of the passport bearer. The International Civil Aviation Organization (ICAO) is setting the standard to be followed by all such smart passport issuers.

Smart documents are known in the art. Smart cards have been used to store personal information and even biometric information about their owners to facilitate electronic transactions. The information is stored on embedded chips, see for example U.S. Pat. No. 6,219,439, the content of which is incorporated herein by reference, U.S. Pat. No. 6,219,439 further describes a identifying characteristic authentication system using a smart card having stored physiological data of a user on a chip disposed therein, and a fingerprint scan (or retina scan, voice identification, saliva or other identifying characteristic data) for comparison against the stored data. The system is self-contained so that the comparison of the identifying characteristic data with the data stored on the chip is done immediately on board the reader without relying upon communications to or from an external source in order to authenticate the user. This arrangement also prevents communication with external sources prior to user authentication being confirmed, so as to prevent user data from being stolen or corrupted.

U.S. Pat. No. 6,101,477 describes a smart card for travel-related use, such as for airline, hotel, rental car, and payment-related applications. Memory space and security features within specific applications provide partnering organizations (e.g., airlines, hotel chains, and rental car agencies) the ability to construct custom and secure file structures. U.S. Pat. No. 5,291,560 describes a personal identification system based on iris analysis. U.S. Pat. No. 5,363,453 describes a personal identification system based on biometric fingerprint data. However, there is no encryption of the biometric information involved.

EP 0019191B1 discloses a paper of value (e.g. an ID) with an integrated circuit in which a checkable coding is written, the communication with the integrated circuit preferably being effected contactlessly via antennas. The integrated circuit is set in the gap of an at least partly metalized carrier foil. This foil is then laminated between two paper webs. Since the carrier foil is only laminated in between the two paper webs, however, there is the danger that the layers can be separated from each other relatively easily so that the plastic inlay provided with the chip can be used for possible forgeries. Further, this security element is a strictly machine-checkable security element that can only be checked by means of special detectors.

U.S. patent application Ser. No. 20030164611 by Schneider discloses a security paper for producing documents of value, such as bank notes, certificates, etc., with at least one multilayer security element. The security element is disposed at least partly on the surface of the security paper and has at least one visually checkable optical effect and at least one integrated circuit. Other recent U.S. patent applications relevant to the subject of the present invention include applications Ser. Nos. 20040081332, 20030117262, 20030116630, 20030099379, 20030093187 and 20020143588.

Another problem with existing smart or "radio operated" cards that include a Radio Frequency ID or RFID chip, is referred to as skimming, snooping or "stolen identity". Because such contactless devices can be read at a distance with a suitable transmitter and receiver, it is possible to surreptitiously obtain information from the card while it remains in the cardholder's possession. This may happen even if the card is in a purse or pocket. Similar stolen identity problems are likely to be encountered in the use of smart passports. Existing systems for preventing theft of information by unauthorized remote reading of an RFID chip in smart cards include various disabling mechanisms that prevent contactless reading of the card unless the mechanism enables signal transmission. Exemplary mechanisms are described in U.S. patent application Ser. No. 10/334,572 filed Dec. 31, 2002 and U.S patent application Ser. No. 10/646,597 filed Aug. 23, 2003, both by Edwin J. Selker. These mechanisms include switches for connecting and disconnecting the antenna from the chip.

All prior art solutions deal with only partial aspects of the problem. All known solutions require basically a new product, fabricated with processes and steps materially different from existing processes and steps used in present day regular (non-smart) passports. Since these processes and steps differ from each other, there is no "standardized" manufacturing of a smart passport. No prior art solution is known to be a full solution that allows a regular passport to be transformed into a smart passport without requiring major production system changes and/or major fabrication step changes. Therefore, it would be advantageous to provide a smart passport that will not require major overhaul of existing methods and systems, yet fulfill its total security and forgery/tamper-proof functions. It would be further advantageous to find a "generic" solution that can incorporate various chips and operating systems (OSs) into the smart passport, which can then be issued by all authorized issuers that use such different chips and OSs.

SUMMARY OF THE INVENTION

The present invention discloses a method and system for providing secure, tamper-free and forgery-proof smart documents, in particular smart passports. The present invention further discloses a smart inlay that has inventive physical security components or "features", and which can be inserted into any standard passport, thereby turning it into a smart passport. The smart inlay of the present invention is functionally flexible in that provides full accommodation of existing and emerging standards in the filed of smart documents, in particular of smart passports. These standards will include requirements for global interoperability, technical reliability, practicality and durability. The emerging standards will most likely require a digital representation of personal biometric information on a contactless chip in the passport booklet or in a visa. The digital representation will include data. The biometric representation may be that of a face and fingerprint or iris. The contactless chip may be made by a variety of manufacturers, according to the ISO 14443A/B or ISO 15693 standards. The booklet may include the smart inlay in its cover (using a cover substantially identical with that of existing, non-smart passports) or in a data page. In a visa, the visa sticker will contain the chip and its antenna.

The biometric information is expected to provide a singular match (comparison) of a person to data stored in a database for identity verification. All digital information on the chip will be cryptographically signed to prevent forgery. The planned biometric storage needs include ca. 12 KB (kilo-bytes) for a face, 10 KB for a fingerprint, 30 KB for an iris and 5 KB for text+overhead. At the least, a smart passport will require will need 32 or 64 KBs. The required antenna size is the same as in ID-1 size documents similar to a credit size card. The inlay has to be mechanically reinforced to protect the inlaid chip and antenna. Finally, the smart passport has to be readable by a contactless reader that supports both ISO 14443A and 14443B standards.

The present invention provides a smart inlay that can accommodate a variety of chips, for example a Philips P5CT072 72K $E^2$PROM or a ST Micro Electronics ST19XR34 34K $E^2$PROM. The present invention further provides an upgrade path from a regular (non-smart) paper passport to a smart passport.

According to the present invention, there is provided a smart electronic personal identification document, comprising: (a) a smart identification module including a contactless chip module and an antenna, the smart identification module being operative to store and exchange personal identification information contactlessly with an external reader; and (b) an anti-skimming element for disposing adjacent to the smart identification module, the anti-skimming element being configured for preventing unauthorized theft of the information.

According to a further feature of the present invention, there is also provided a booklet having a plurality of pages, the smart identification module being incorporated with one of the pages.

According to a further feature of the present invention, the booklet is a passport booklet.

According to a further feature of the present invention, the anti-skimming element is an electrically conductive shield disposed adjacent to the smart identification module.

According to a further feature of the present invention, there is also provided a holder for carrying the smart identification module, wherein the anti-skimming element is disposed in the holder.

According to a further feature of the present invention, the anti-skimming element is an electrically conductive shield disposed in the holder.

According to a further feature of the present invention, the anti-skimming element is formed from an electrically conductive material selected from the group of metallic materials, conductive polymers and conductive composites.

According to a further feature of the present invention, the anti-skimming element includes a switching arrangement electrically connected to the smart identification module, the switching arrangement being configured for selectively enabling and disabling transmission of the information by the smart identification module.

According to a further feature of the present invention, the switching arrangement is disposed in the antenna.

According to a further feature of the present invention, the switching arrangement is configured in order to be actuated by an external key.

According to a further feature of the present invention, the switching arrangement is disposed between the chip module and the antenna.

According to a further feature of the present invention, the switching arrangement is configured to selectively enable and disable the output of the chip module.

According to a further feature of the present invention, there is also provided a booklet having a plurality of pages, the smart identification module being attached to one of the pages, the switching arrangement including a mechanical switch disposed in the booklet such that, when the booklet is closed, the switching arrangement disables transmission of the information by the smart identification module.

According to a further feature of the present invention, the mechanical switch is configured such that, when the booklet is opened more than a threshold angle, the switching arrangement enables transmission of the information by the smart identification module.

According to a further feature of the present invention, the switching arrangement includes a light sensor configured such that, when the light sensor is exposed to light above a threshold light level, the switching arrangement enables transmission of the information by the smart identification module.

According to a further feature of the present invention, the chip module has a power supply voltage input pin and an output enable pin, the light sensor being electrically connected to the power supply voltage input pin and the output enable pin so that light incident on the light sensor selectively enables and disables the output of the chip module.

According to a further feature of the present invention, the anti-skimming element includes an absorbing element configured for at least partially absorbing electromagnetic waves propagated between the smart identification module and any external reader.

According to a further feature of the present invention, the absorbing element is configured for resonating at the frequency of the electromagnetic waves.

According to a further feature of the present invention, the absorbing element is an absorbing electronic element including a circuit and an antenna electrically connected to the circuit.

According to a further feature of the present invention, the absorbing element is an absorbing magnetic element.

According to a further feature of the present invention, the absorbing magnetic element includes ferrite dust.

According to a further feature of the present invention, the anti-skimming element includes a phase-shifting electronic element configured for transmitting a signal which is out-of-phase with the electromagnetic waves thereby generating at least one interference with the electromagnetic waves and noise.

According to the teachings of the present invention there is also provided a electronic personal identification processing system for processing information of a smart electronic personal identification document, the document including a contactless chip module and an antenna, the document being operative to store and exchange personal identification information contactlessly with an external reader, the system comprising: (a) a personal identification document reader configured for reading the information contactlessly from the smart electronic personal identification document; (b) a processing terminal configured for sending commands to the reader and for validating the information from the document; and (c) a communication link operationally linking the reader and the processing terminal, each of the reader and the processing terminal including an encoder and decoder arrangement so that data transmitted between the processing terminal and the reader is encoded.

According to a further feature of the present invention, the reader is a passport reader configured for contactlessly reading information from passports.

According to the teachings of the present invention there is also provided a personal identification document reader for reading information from a smart electronic personal identification document, the document including a contactless chip module and an antenna, the document being operative to store and exchange personal identification information contactlessly with an external reader, the reader comprising: (a) a housing; and (b) a contactless reading element configured for contactlessly reading the information from the document, the reading element being disposed in the housing, the housing having an opening therein for inserting the document into the housing for reading by the reading element, the housing being configured as a faraday cage thereby preventing unauthorized theft of the information stored in the document while being read by the reading element.

BRIEF DESCRIPTION OF THE DRAWINGS

The invention is herein described, by way of example only, with reference to the accompanying drawings, wherein:

FIG. 10b is a schematic view of a passport reader for use with the smart identification module of FIG. 10a;

FIG. 15b is a plan view of the passport reader of FIG. 15a; and

DETAILED DESCRIPTION OF THE PREFERRED EMBODIMENTS

The present invention discloses devices and methods for providing secure, tamper-free and forgery-proof smart documents, in particular smart passports. The present invention discloses in particular a smart inlay to be used in a smart passport, and security features that make such a smart passport tamper-proof and forgery-proof. The present invention further provides an upgrade path from a regular (non-smart) paper passport to a smart passport.

Figure 1A:
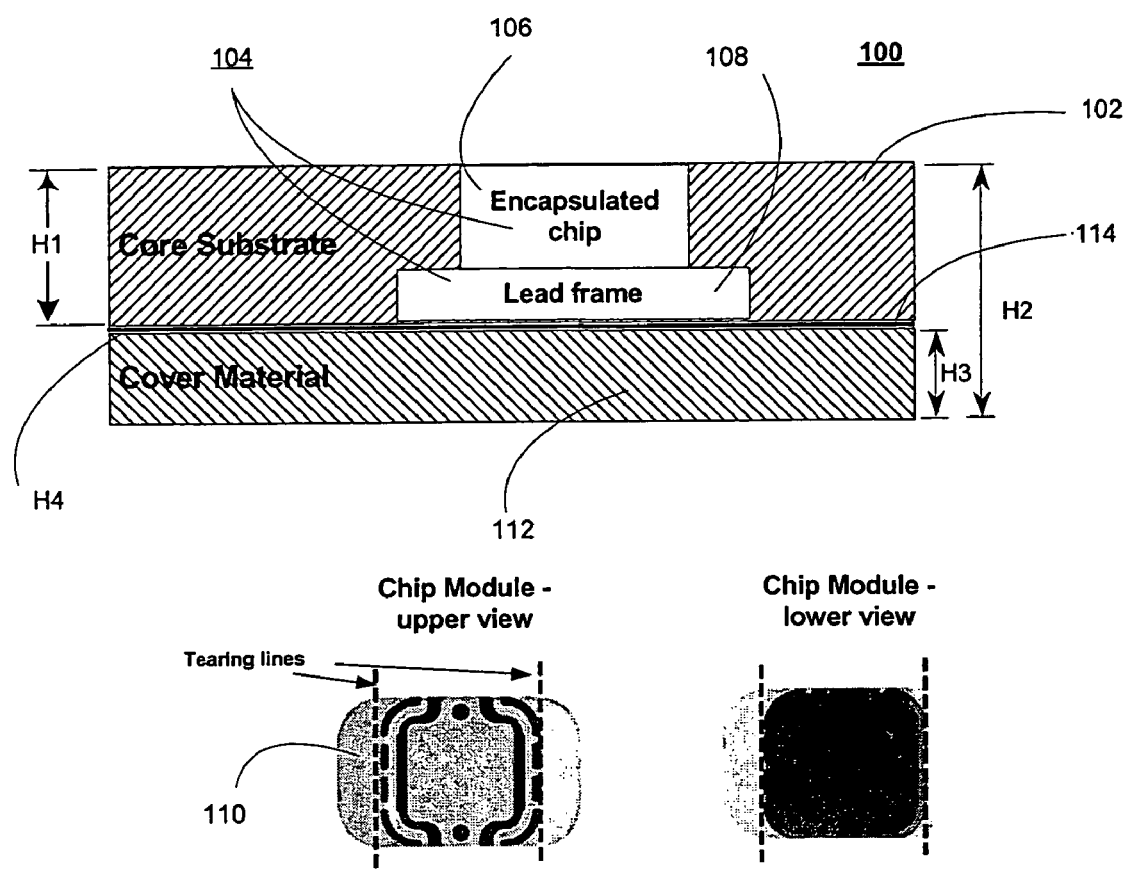
FIG. 1 shows a preferred embodiment of a smart inlay that is constructed and operable in accordance with a preferred embodiment of the present: a) cross-section; b) top view; c) top view of three attached smart inlays; and d) view of a smart inlay trimmed from a strip.

FIG. 1a shows in cross section a preferred embodiment of a smart inlay 100 according to the present invention. Smart inlay 100 comprises a core substrate (or "core layer") 102 made preferably of synthetic sheets, e.g. from Teslin manufactured by PPG Industries (www.ppg.com) or Artisyn manufactured by Darmic Inc. (www.daramic.com). Each of these materials provides a number of important advantages: each allows a judicious choice and application of tamper-proof adhesives, for example poly-vinyl-acetates (PVAs), thermoplastic adhesives such as ethylene vinyl acetate (EVA) or polyethylene (PE), or the family of thermo-set adhesives. Teslin and Artisyn are further advantageous in that one can use most adhesives or glues that are water-based, solvent-based or heat or pressure activated, single or dual component. Alternatively, the core substrate material may include Vinyl or Polyurethane based materials. Smart inlay 100 further comprises an embedded contactless chip module 104 that includes an encapsulated chip 106 and a lead frame 108, and tearing lines ("tear lines") 110 that provide a first main inventive security component. Tear lines 110 are preferably positioned under the lead frame electrodes. Alternatively, in some embodiments, the tear lines may extend the whole width of the inlay, to provide added bending flexibility (in addition to a weak spot) to the passport into which the inlay is incorporated (see below). Smart inlay 100 further comprises an antenna 120 that allows two-way communication between the chip and an outside contactless reader system (not shown). The chip module is electrically connected to the antenna through the lead frame. Optionally, smart inlay 100 further comprises a cover material 112 attached to the core by a thin layer of adhesive 114, preferably a highly solvent resistant adhesive, and most preferably a thermo-set-type adhesive with a relatively high bond breaking temperature, e.g. serial number 9534 manufactured by Apollo (www.apolloadhesives.com), 3M (www.3m.com) adhesive sheet 9218, 9200 or 9328, or Scapa Tape G175 (www.scapatapesna.com). The core substrate has a typical thickness of 220-240 micron, while the smart inlay has a typical size that fits in a page of a smart passport, see for example FIG. 1b. Other dimensions in FIG. 1a are marked H1, typically 380 microns, H2, typically 30 microns, H3, typically 350 microns and H4, typically 20-50 microns. Advantageously, the chip may be any standard chip such as a Philips P5CT072 72K E$^2$PROM or a Thompson ST19XR34 34K E$^2$PROM.

Figure 1B:
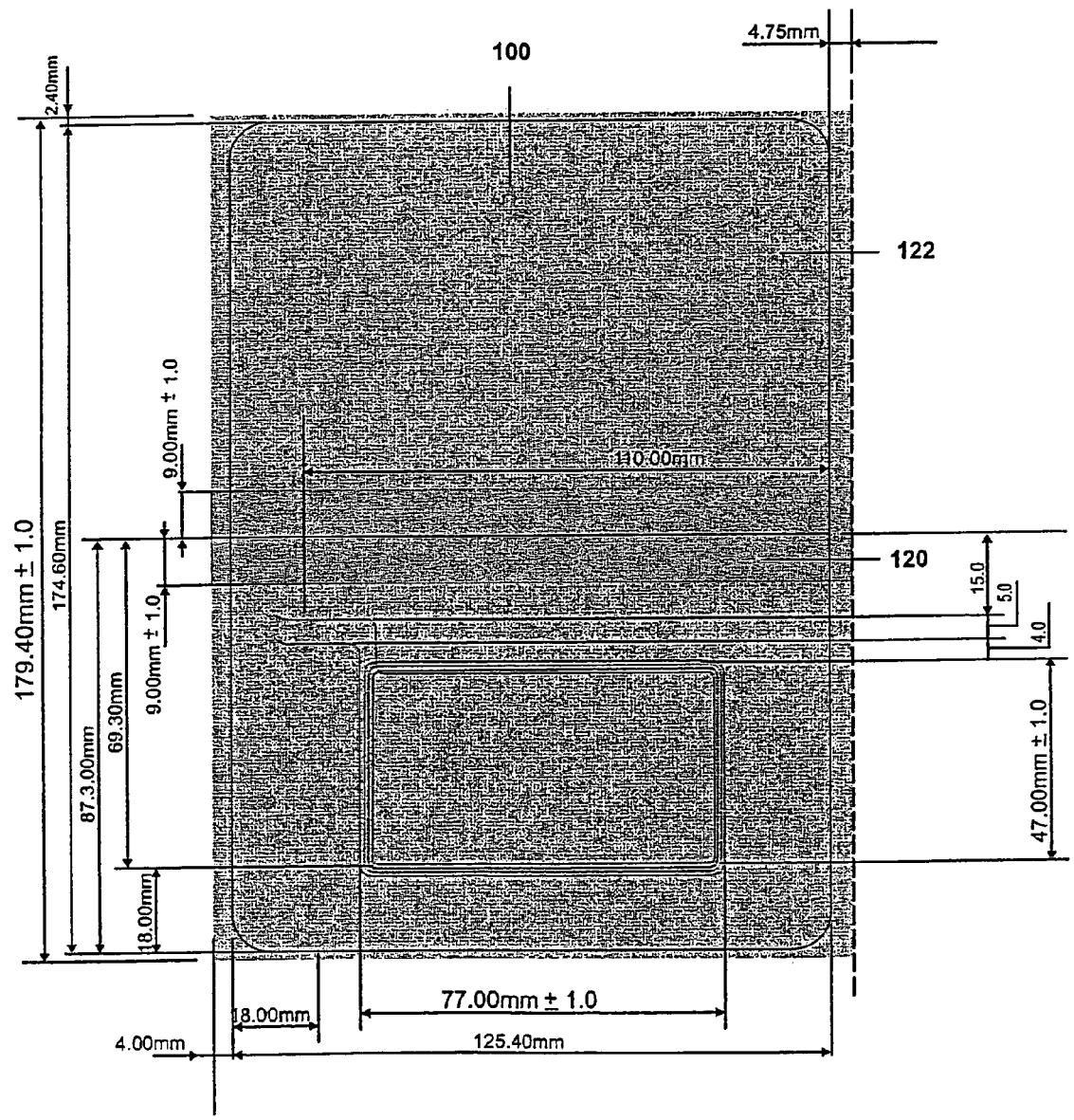
Figure 1C:
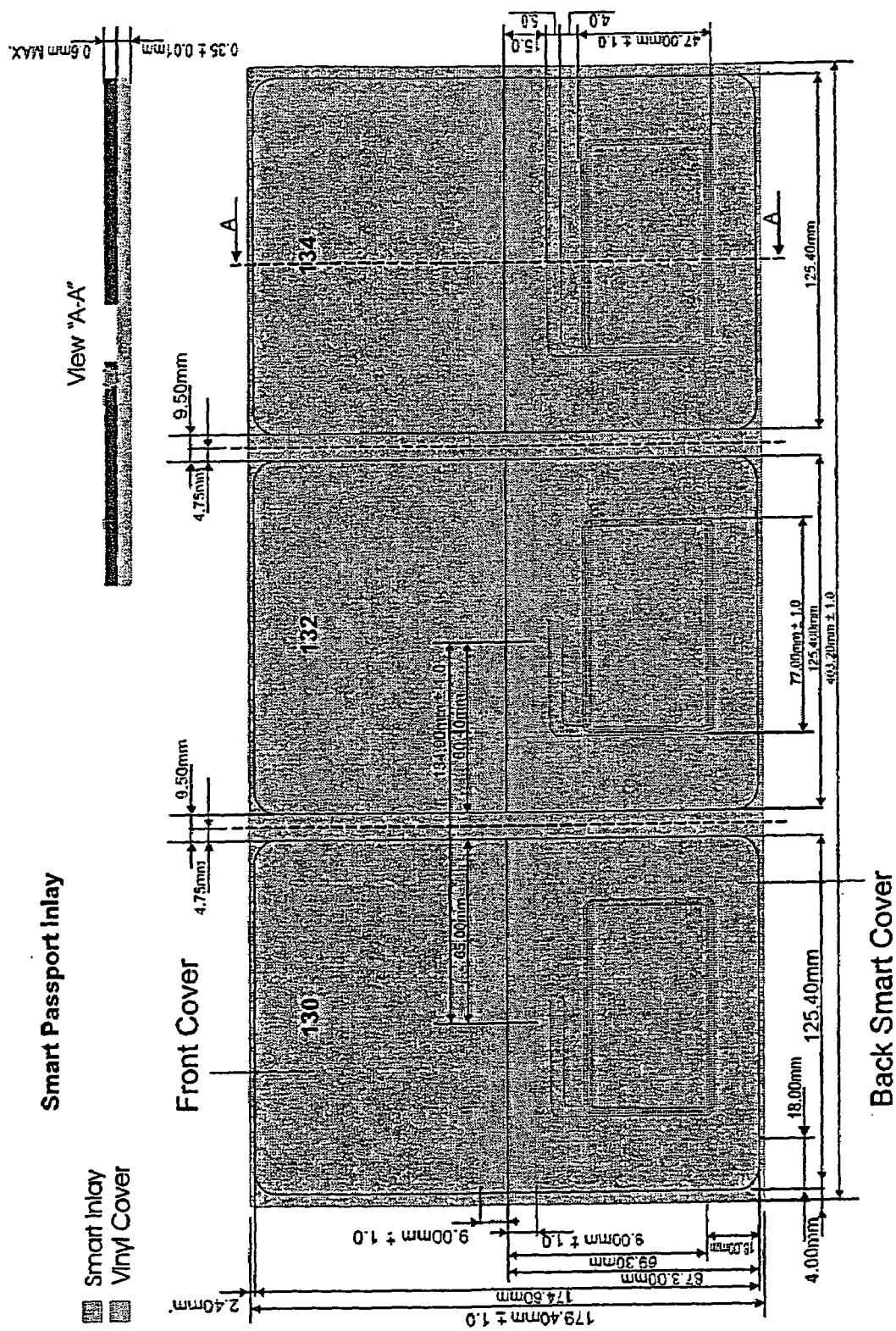
Figure 1D:
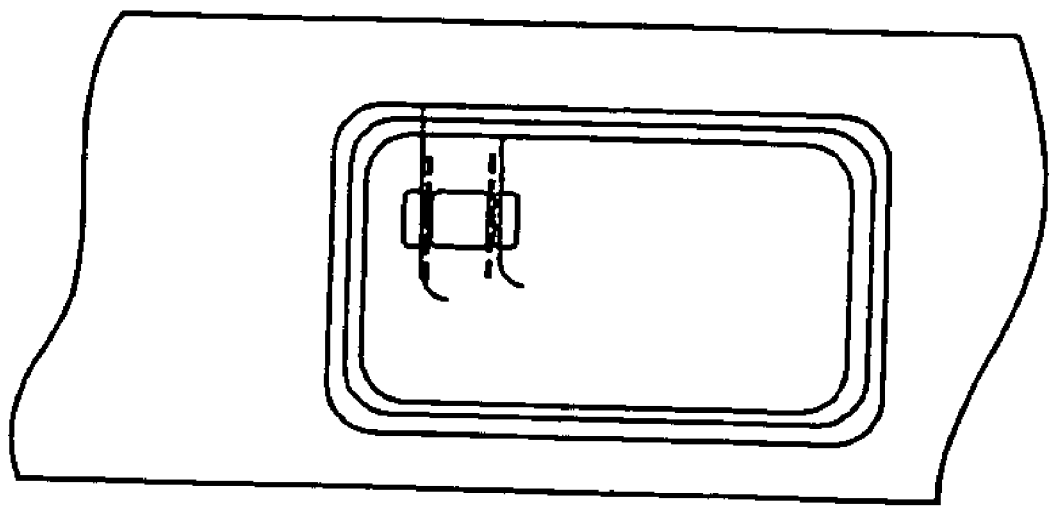

FIG. 1b shows in a top view a smart passport inlay ("smart cover") with vinyl cover 120 (normally inserted in the "back cover" of a passport, see below) complemented by a "dumb" section 122 (normally inserted in a "front cover" of a passport, see below), both with typical dimensions indicated on the figure. As shown in FIG. 1c, for efficient production purposes (described in more detail in FIG. 3a), the smart inlay may be included in a set of attached smart inlays on a continuous reel, in this case three inlays 130, 132 and 134. FIG. 1d shows a single smart inlay 150, cut away from the continuous reel. The dimensions shown in both FIGS. 1b and 1c are exemplary only, and are in no way limiting.

Figure 2:
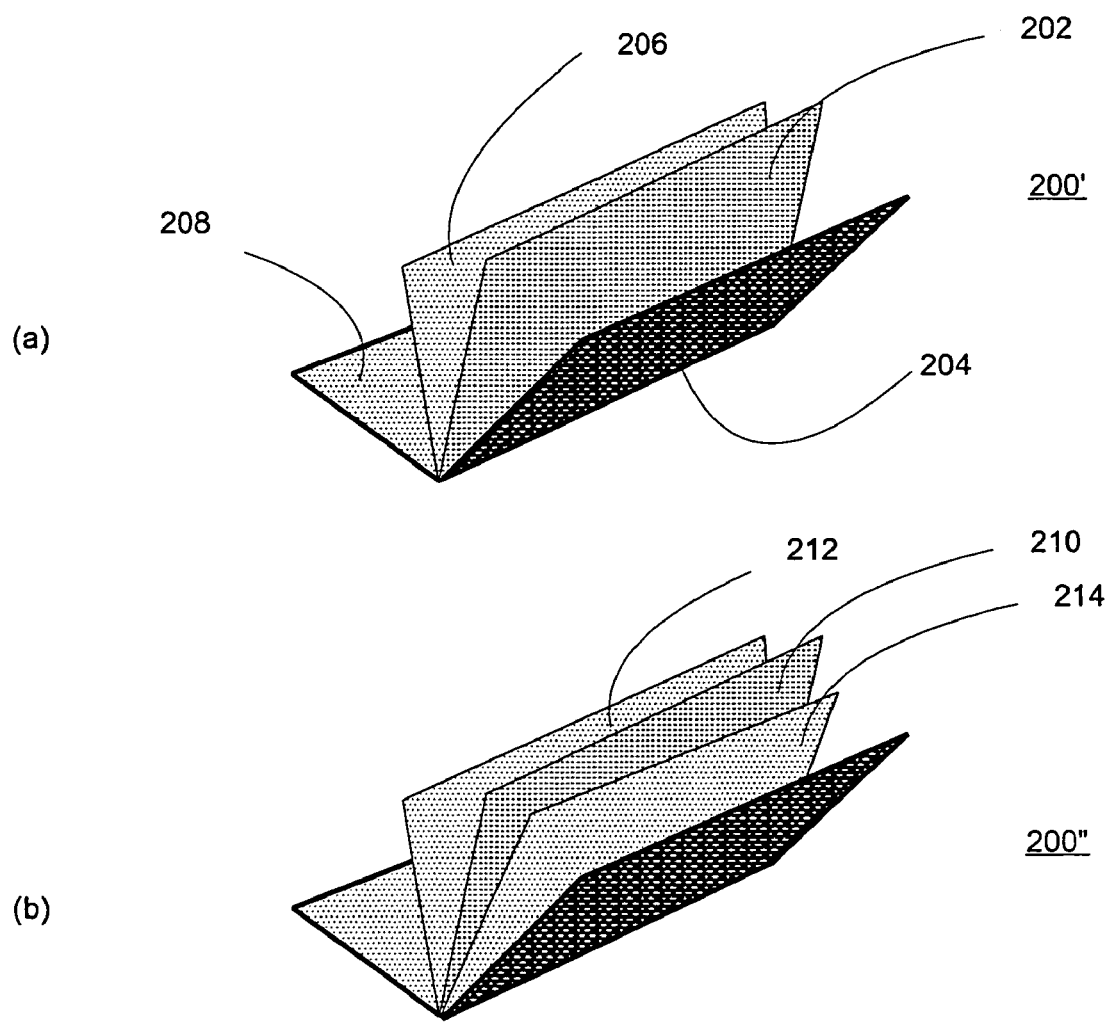
FIG. 2 shows embodiments of a smart passport incorporating the smart inlay according to the present invention: a) attached to a smart passport cover; b) inserted into the inside of a smart passport booklet.

FIG. 2a shows a smart passport booklet 200' that includes a smart inlay 202 incorporated into a cover 204 (usually a back, fiber-reinforced vinyl cover, for example one manufactured by ICG Holliston (www.icgholliston.com)). The figure further shows an external booklet page 206 and the rest of the booklet contents 208. FIG. 2b shows a smart passport booklet 200" in which a smart inlay 210 is incorporated between two internal pages 212 and 214. In this case, the inlay may be glued to either one or both of the internal pages, attached directly to the passport backbone, or both. The attachment to the passport backbone can be done either by sowing part of the inlay into the backbone, by lamination to a cover or to a page, by gluing, or by other known means.

Figure 3A:
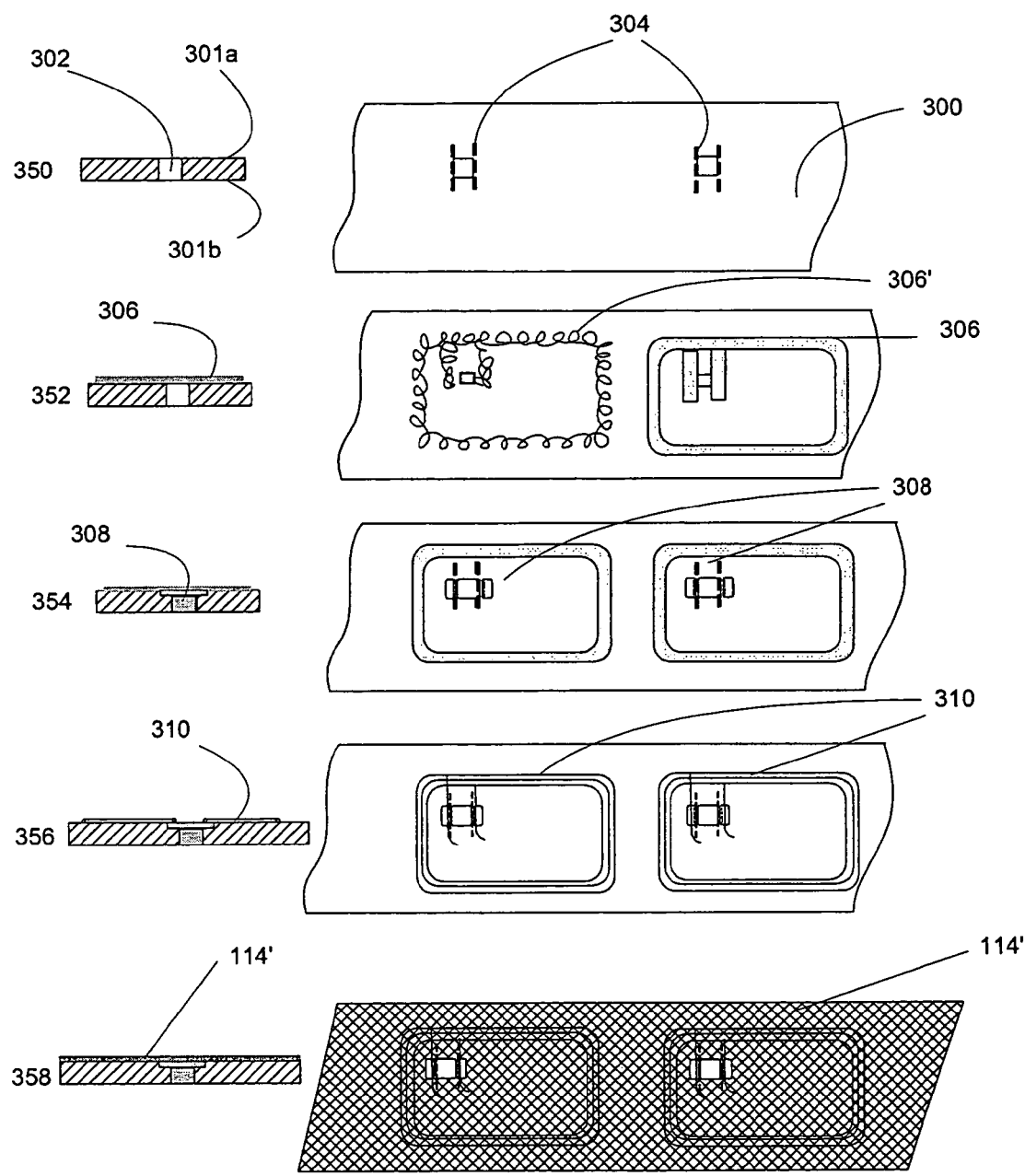
FIG. 3 shows schematically steps in the manufacturing of the smart inlay: a) main process steps; b) detail of a patterned first adhesive with "voids"; c) various adhesive patterns overlaid with an antenna.

FIG. 3a shows schematically steps in a preferred manufacturing process of the smart inlay of the present invention. The manufacturing is performed in a system in which a continuous material strip 300, preferably made of Teslin or Artisyn is fed by a reel. Smart inlay cores with a top surface 301a and a bottom surface 301b are part of strip 300. First, a chip hole 302 and local weakening patterns in the core layer, referred to hereinafter generically as "tear lines" 304 are fabricated (e.g. punched) in the feed strip in a step 350. The tear lines are designed to provide a local weak link in the smart inlay, so that any attempt to separate the core layer from the cover will lead to irreversible core substrate deformation and mechanical destruction of the antenna/chip assembly. That is, such an attempt will cause the separation of the antenna from the chip, or the breakup of the chip electrode/lead frame. This is one main inventive physical security feature of the smart inlay of the present invention. The tear lines may be in the form of perforations, preferably positioned under the electrode area as shown in FIG. 1a or as thinned areas in the core layer in the same places. Any attempt to tamper with the finished inlay, e.g. trying to separate the core layer from the vinyl cover (or from an internal cover or page if the inlay is inserted between two booklet pages) will result in the failure described above. A first adhesive pattern 306 designed for antenna positioning and securing to the core (also referred to herein as "antenna base adhesive") is deposited on top surface 301a in step 352. The antenna base adhesive pattern may be variable in size and shape, and may cover either partially or substantially totally the area of the top surface. In case it covers substantially the entire inlay surface, this may be the only adhesive layer applied in the manufacturing process. The adhesive may be any type of adhesive, for example PE or EVA, an adhesive such as 3M adhesive sheet 9218, 9200 or 9328, Scapa Tape G175, or a pressure sensitive adhesive such as D74 manufactured by Colquimica (www.colquimica.pt).

Figure 3B:
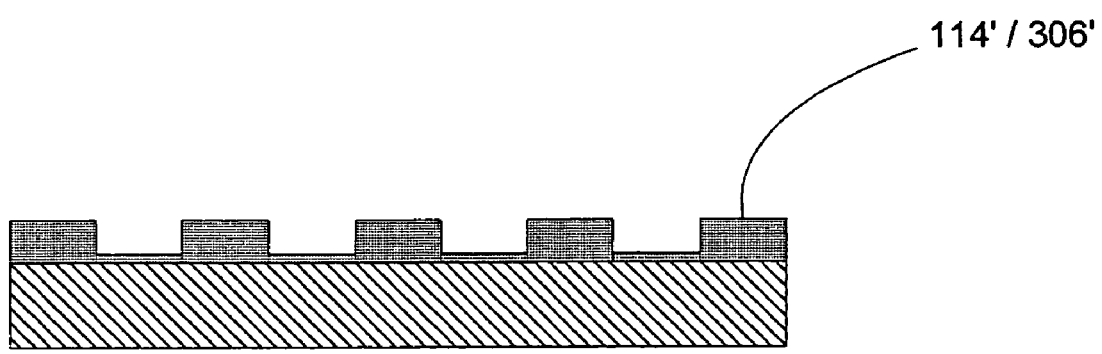

In the case of the first adhesive layer being the only layer in the process, the preferred adhesive is a thermo-set adhesive such as serial number 9534 manufactured by Apollo (www.apolloadhesives.com). Thermo-set adhesives behave irreversibly and have a wide range of bond-breaking temperatures that reaches over 200 degrees C. This makes the adhesive itself the "strong" link in the composite layer structure, and ensures failure in places other that the adhesive, providing yet another inventive physical security feature. Furthermore, if the first adhesive is the only adhesive used, it is further preferably patterned, as explained with reference to FIG. 3c below. As used herein, a "patterned" adhesive means any non-smooth, irregular adhesive surface, layer thickness, or general appearance. Preferably, the pattern follows some regular periodic form or topology such as regular corrugations, mesh, waves, zigzag, spring-like, or other geometric shapes. Inventively and advantageously, the first adhesive pattern may be segmented or placed in a patterned structure 306' that has gaps or "voids", as shown in FIG. 3b. This allows a second adhesive (glue) layer 114' (see below) to fill the gaps, creating a composite structure of the two glues and further strengthening the product. In other words, the non-smooth and non-uniform application of the first glue layer that leads to the formation of a composite, interlaced, or intermingled structure with the second adhesive, results in even greater resistance to tampering and forgery. If any attempt is made to separate the smart inlay layers, or to separate the inlay from the cover or page it is attached to, the strong adhesive composite will cause failure in a non-adhesive "weak spot" and result for example in the tearing of the antenna or of the smart inlay layer materials, or in the destruction of the chip. The glue may be also layered on the chip area, leading to additional weak spots (added to those provided by the tear lines) which may cause potential breakage of the chip if an attempt is made to separate the layers.

In step 354, a chip module 308 (shown in more detail in FIG. 1a) is pressed in from the top surface into chip hole 302. In step 356, an antenna 310 is wound on top of the patterned adhesive layer and attached (e.g. welded or soldered) to respective chip connections on the chip lead frame. This is followed by pressing the antenna, typically under additional heating into adhesive pattern 306 to form a flat surface.

Figure 3C:
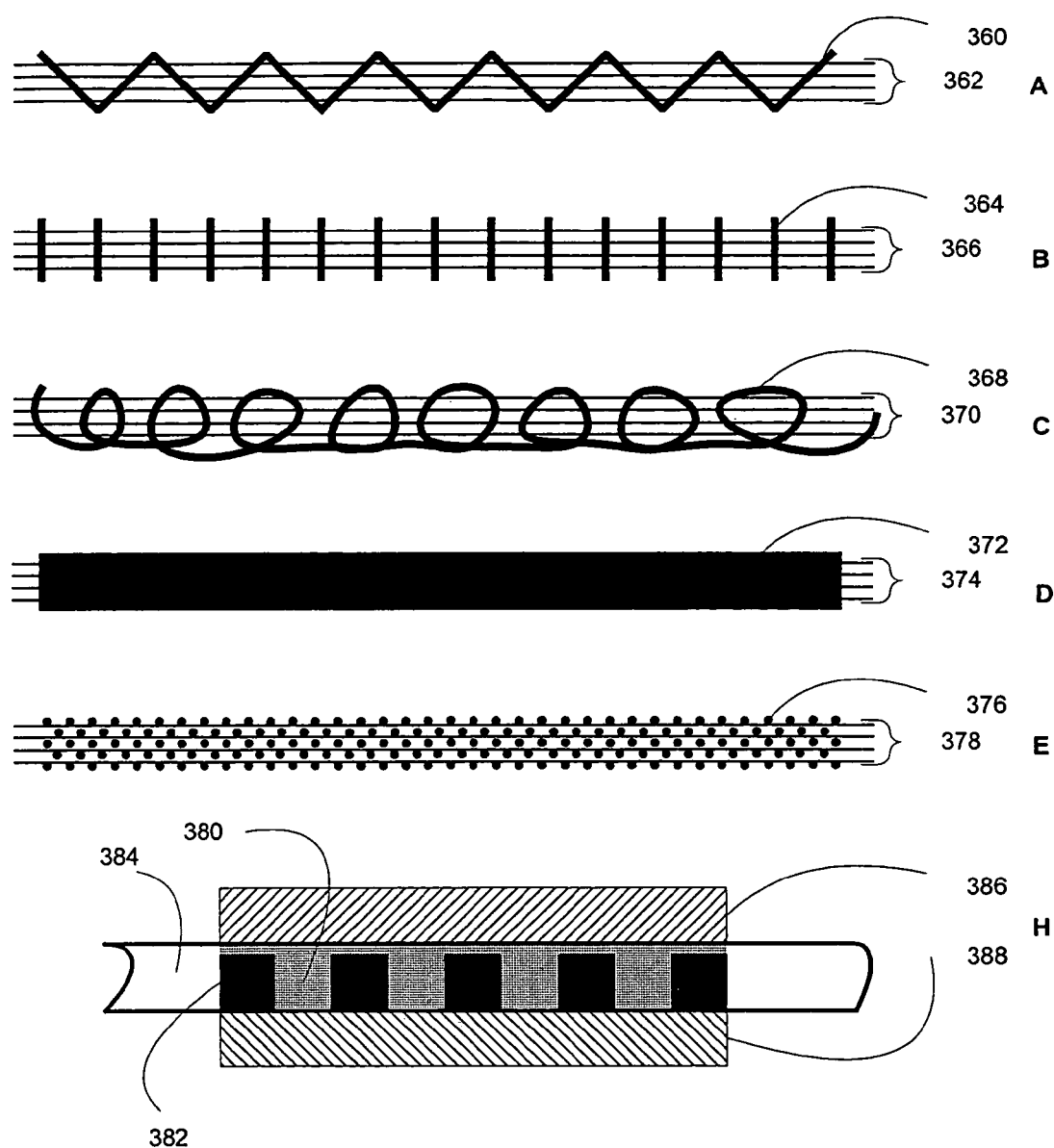

As mentioned, when the smart inlay (and its "dumb" section in case of a smart cover) produced in steps 350-356 is about to be attached to a cover, a second adhesive layer 114' (used if the first adhesive layer does not fulfill that function) is introduced between the inlay and the cover and used to fill any voids in glue layer 306'. The introduction of this layer is shown in an additional step 358. It has been determined experimentally that attempts to peel off the inlay from the cover show distinct tampering effects when second adhesive layer 114' is also applied in a patterned form (independently of the form, patterning or even presence of a first adhesive layer), as shown in both step 358 and in a cross section in FIG. 3b, which shows a tooth-like adhesive layer 306' or 114' formed on the core substrate. To emphasize, patterning either or both adhesive layers advantageously improves the security aspects of the smart inlay and passport of the present invention. This constitutes yet another inventive physical security feature of the present invention FIG. 3c shows several exemplary embodiments of geometries of patterned adhesives according to the present invention. Embodiments A-E show a first adhesive overlaid with the antenna, and embodiment H shows a cross section of a composite, two-adhesive structure with the antenna in the middle. In more detail, embodiment A shows a zigzag first adhesive pattern 360, overlaid by an antenna 362. Embodiment B shows a series of glue segments 364 overlaid by an antenna 366. Embodiment C shows a "stretched spring" adhesive pattern 368 overlaid by an antenna 370. Embodiment D shows a full adhesive strip 372 overlaid by an antenna 374. Embodiment E shows a dot adhesive pattern 376 overlaid by an antenna 378. In all cases, "overlaid" preferably also means that the antenna is actually sunk into the adhesive, so that is in the same plane as the adhesive. Methods for deposition of patterned adhesives are well known in the art.

Embodiment H shows in cross section a composite adhesive structure in which a first adhesive 380 and a second adhesive 382 (both having a tooth-like appearance as in FIG. 3b) are interlocked or interlaced, locking in an antenna 384. The first adhesive is deposited such that it has a plurality of holes, "dips" or "valleys" in the vertical direction perpendicular to the core substrate top surface. The antenna is wound and pressed in, preferably under heat, as described in step 356. The second adhesive layer is then applied, filling in the holes, dips or valleys of the first adhesive, and locking the antenna in place in the composite two-adhesive layer. The cross section in H is in essence an enlargement of line 114 with thickness H4 in FIG. 1a for a specific embodiment. Thus, the two adhesives and the antenna are locked between a core substrate 386 and a cover 388.

The invention thus advantageously provides a number of physical security features, some of which have been mentioned above and some of which will be discussed in more detail now. All physical security features are geared toward providing a tamper-proof product. First, the tear lines mentioned and shown with regard to FIG. 1a provide security by causing destruction of the functional integrity of the smart inlay (e.g. separation of the antenna from the chip or breakage of either the antenna or the chip) in the case of any tampering attempt. Second, the use of preferably thermo-set adhesives implies irreversibility and allows a choice of high enough bond-breaking temperatures. This ensures that any attempt to separate the different layers results in layers deformation or destruction before adhesive bond breaking. Third, the patterning either of the first or of the second adhesive (or both coexisting together) provides additional tamper-proof security because the adhesive competes locally in strength with the core material.

Figure 4:
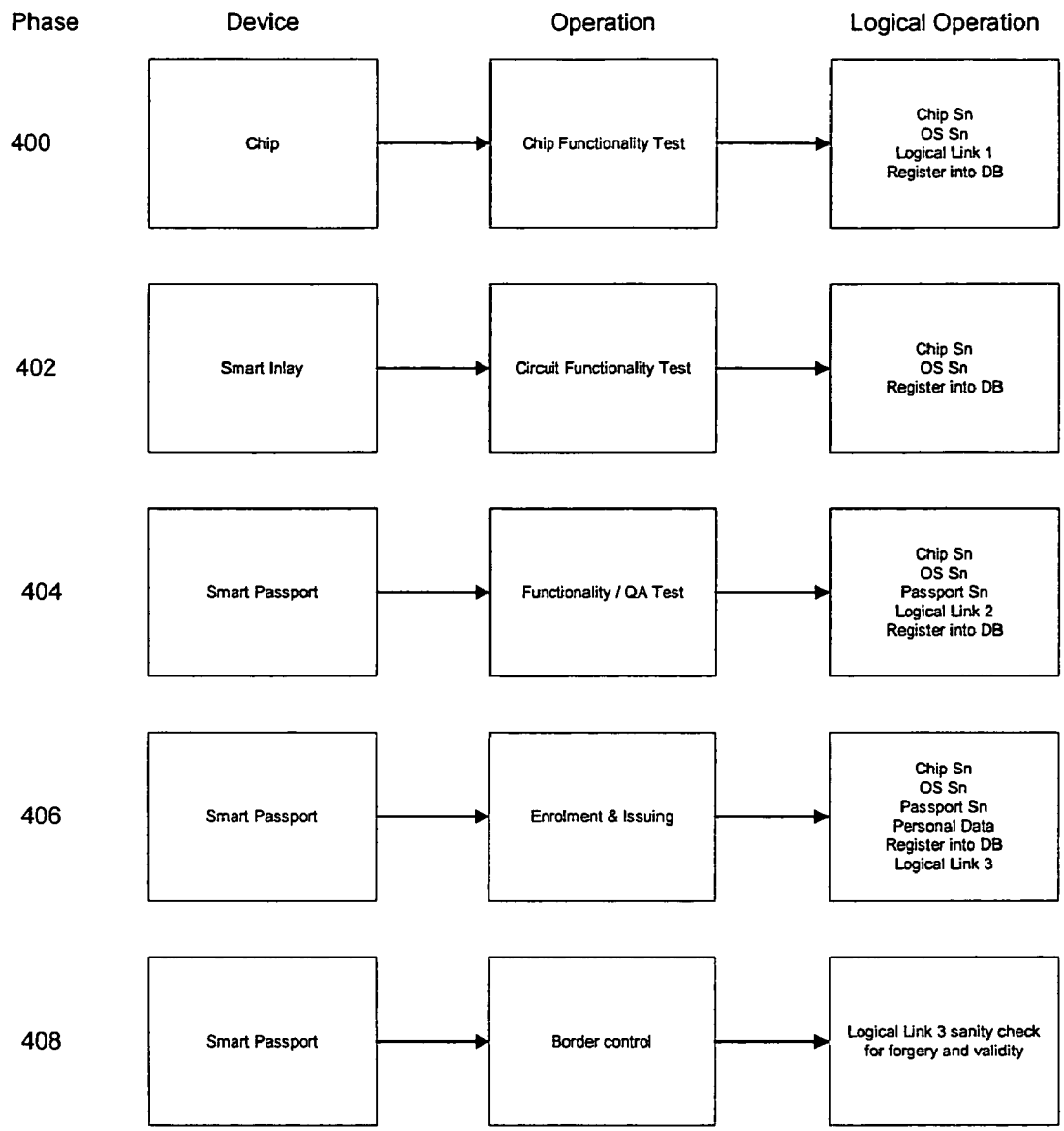
FIG. 4 shows schematically a summary of a set of logical operations involved in functionalizing the smart passport and rendering it logically forgery-proof.

FIG. 4 shows schematically a summary of a set of logical operations involved in functionalizing the smart passport and making it logically forgery-proof. The set of operations includes five phases, each phase including a physical operation performed on a device, and an attendant logical operation occurring in a computer database. In phase 400, the chip functionality is tested, resulting in the storage (registration) of a chip serial number (CSN) and a chip operating system serial number (OSSN) in the computer database. The database allows to establish a unique logical link between the CSN and the OSSN, referred to herein as "logical link 1". In phase 402, the complete circuit of the smart inlay including the antenna is functionally tested and the results registered in the database. In phase 404 the smart passport is functionally tested, and a passport serial number (PSN) identifying the passport booklet is retrieved from the booklet and registered in the database. This establishes a second logical link between the CSN, OSSN and PSN, referred to herein as "logical link 2". In phase 406, the passport is issued to a particular person, and personal information, preferably biometric (e.g. photo, iris, fingerprint, etc.) is inserted into both the passport and the database. At this stage, a unique link (also referred to as "logical link 3") is created between the passport and the person to which it is issued using a combination of some or all of logical links 1 and 2 and the personal information. This may be done for example by creating a unique "key" or "secret" using encryption or encoding well known in the art. The "key" or the "secret" is stored in the database and optionally in the passport (chip) and may be retrieved after accessing its location in the chip memory using an access key. In phase 408, the smart passport is presented at a border control station to identify its carrier. A check is made to restore the unique "key" or "secret" formed by the combination of logical links 1 and 2 and the personal information of the carrier. The result of this check is matched against the stored "key" or "secret" stored in the database and optionally in the passport. If there is no fit, the implication is that the carrier and the passport do not match, and/or that the passport is forged.

Figure 5:
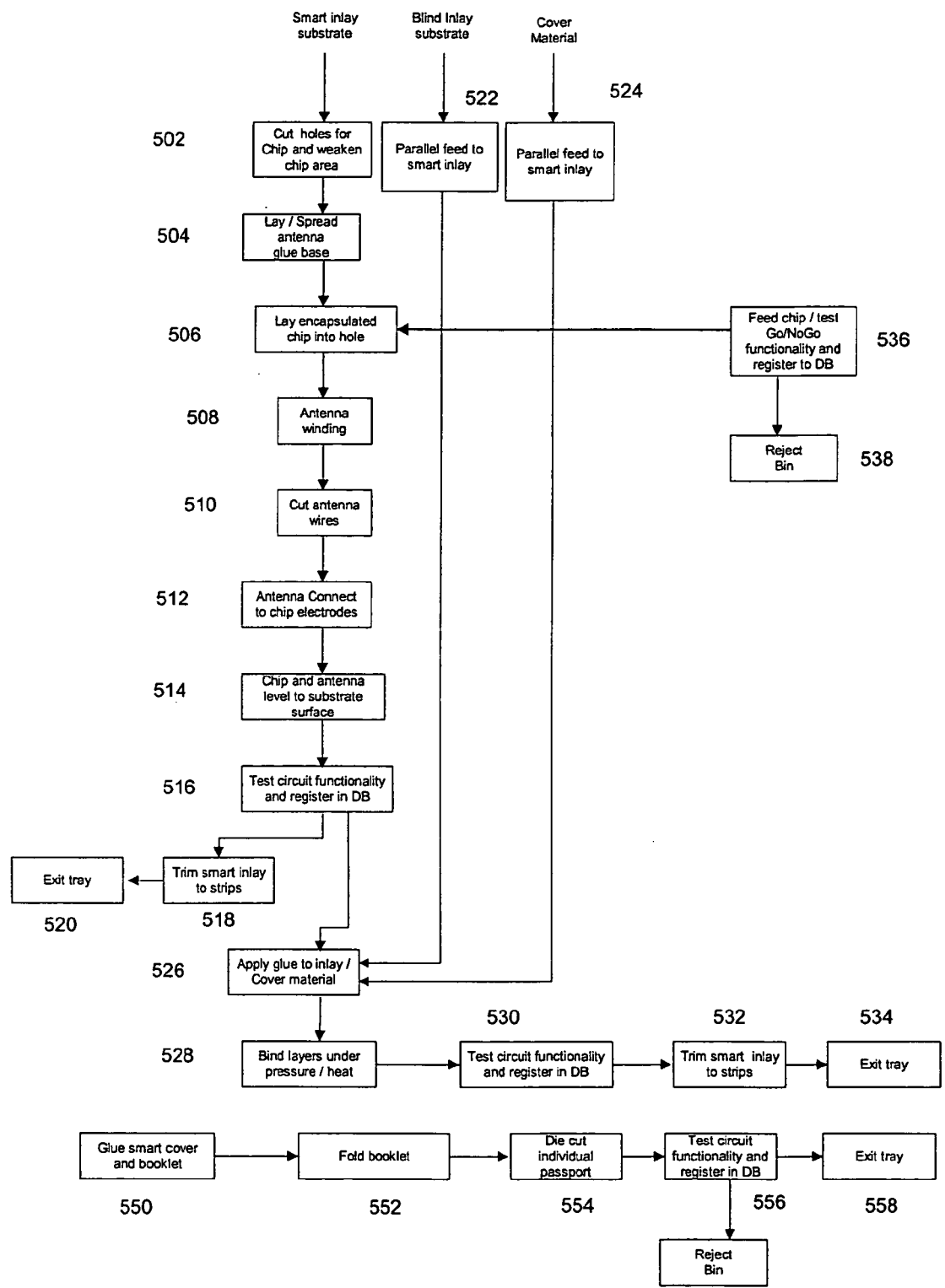
FIG. 5 shows a detailed flow-chart of the operations involved in the fabrication and functionalization of both a smart inlet and a smart passport.

FIG. 5 shows a detailed flow-chart of the operations involved in the fabrication and functionalization of both a smart inlet and a smart passport. The process starts with the fabrication of the smart inlay substrate, in a system that may be substantially similar to that described for smart cards in U.S. Pat. Nos. 6,108,022 and/or 5,973,710 to Landsman. Following essentially the steps in FIG. 3a, chip holes and weakened substrate areas (tear lines) are made in a core substrate in step 502, followed by spreading of the antenna glue base (first adhesive layer) in step 504, and insertion of the encapsulated chip into the hole in step 506. At this point, a chip functionality test (process 400 in FIG. 4) is run in step 536 to test Go/NoGo chip functionality and to essentially form logical link 1 as described above. If the test fails, the -chip is rejected in step 538 and another chip is placed in the hole. If the test is successful, the antenna is wound on the adhesive layer in step 508, its wires are trimmed (cut) in step 510 and the antenna is welded to the chip electrodes in step 512. The chip and antenna are then leveled flush with the top surface of the core substrate in step 514. A second test (process 402 in FIG. 4) is run to test circuit functionality, i.e. to confirm that the circuit is active. If the test fails, the smart inlay is marked and trimmed into a strip in step 518 and placed in an exit tray in step 520 (resulting in the product seen in FIG. 1b). To produce a smart cover, a blind inlay substrate material similar to the smart inlay core is supplied in step 522, a preferably vinyl cover material is supplied in parallel in step 524, and all three elements (smart inlay substrate, blind inlay substrate and cover) are bound together in step 526. The binding is preferably done by applying the second adhesive layer to either the inlay, the cover or both. The layers are bound under pressure and heat (depending on the type of glue) in step 528, followed by a third test (process 404 in FIG. 4) in step 530, following which a defected smart cover is marked. A "good" smart inlay is trimmed to strips in step 532 and placed in an exit tray in step 534 (resulting in the product shown in FIG. 1*c*).

The smart passport is now prepared using the smart inlay provided in step 534. If in the form of a smart cover, the smart inlay is glued or attached otherwise to a passport booklet in step 550, the booklet is folded in step 552, and each individual passport is cut in step 554. A fourth test (process 406 in FIG. 4) is run in step 556. If the test fails (passport does not respond to a reader), the smart passport is marked as rejected and placed in a reject bin in step 560. If the test succeeds, the passport is ready for issuing and placed in an exit tray in step 558.

Stolen Identity Prevention

By way of introduction, the smart passport of the present invention described hereinabove is further protected against stolen identity by the using an anti-skimming element. The anti-skimming element generally prevents a passport reader from reading information of the passport when the passport is closed and therefore not intended for use. Various anti-skimming elements are described below with reference to FIGS. 6 to 13 for deployment in the passport booklet. The embodiments of FIGS. 6, 7 and 11-13 are also for deployment in a holder configured for storing the passport booklet when the passport booklet is not in use.

The anti-skimming elements have been described hereinbelow for use with a smart passport and smart passport readers. However, it will be appreciated by those ordinarily skilled in the art that anti-skimming elements can be deployed with any contactless electronic personal identification documents, which are readable by contactless personal identification document readers. The electronic personal identification documents are typically part of a booklet (for example, a passport) or a card (for example, a driving license). The booklet or card are typically stored in a holder. Personal identification typically includes such details as name, address, and place and date of birth.

Figure 14:
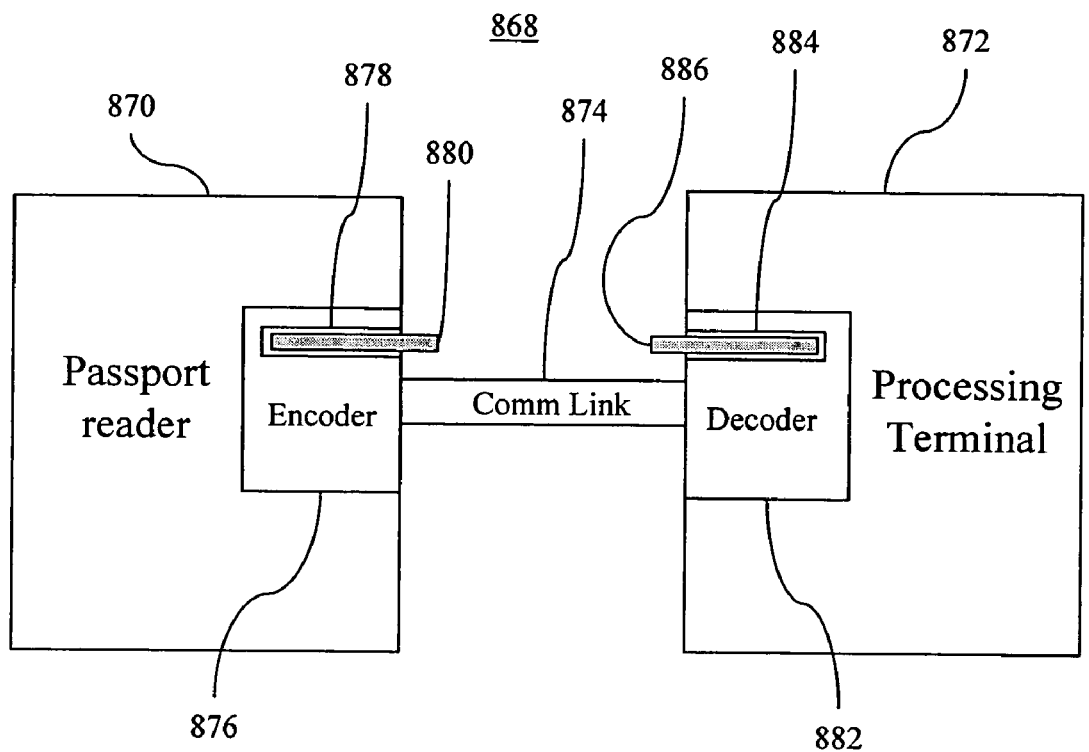
FIG. 14 is a schematic view of a passport information processing system that is constructed and operable in accordance with a preferred embodiment of the present invention.

FIGS. 14 and 15 describe passport reading and validation systems which further prevent unauthorized acquisition of passport information. It will be appreciated by those ordinarily skilled in the art that the teachings of the passport reading and validation systems described herein can be applied to contactless personal identification document readers and processing systems in general.

Figure 6:
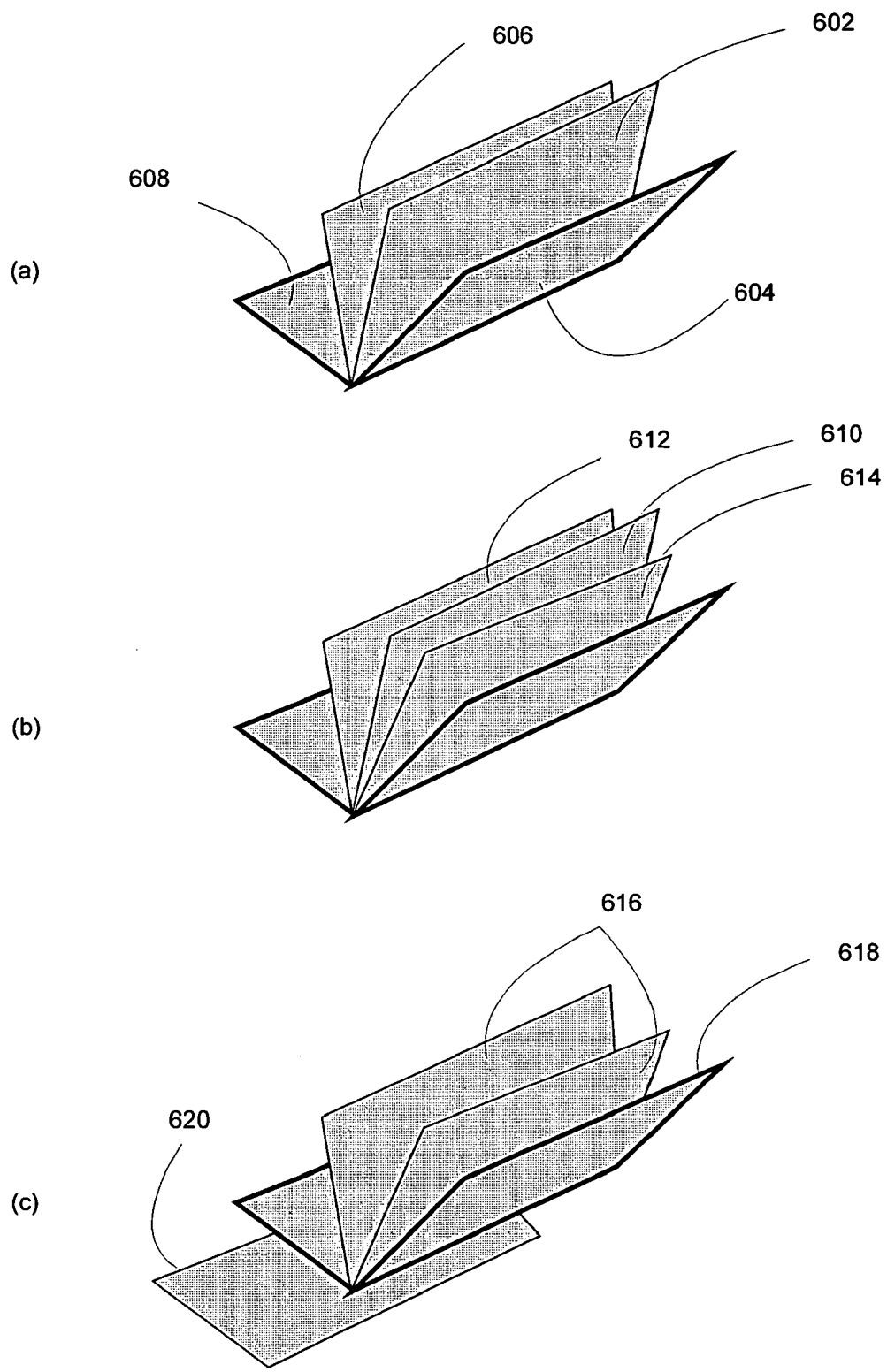
FIG. 6 shows a shielding element for use with the smart passport of the present invention: a) in between a page and the cover; b) in between two pages; c) on the external face of the cover.

Reference is now made to FIG. 6, which shows a smart passport booklet, of the type described hereinabove. In order to prevent a stolen identity action, the passport further comprises a shielding element 602 (or simply "shield"), operative to shield the antenna in the smart inlay (e.g. 120 in FIG. 1) from an external reader. In the most general sense, the shield may have any profile capable of electrically shielding the antenna. In accordance with a preferred embodiment of the present invention, two shields are disposed, each on a separate page, in order to surround the chip and antenna when the passport booklet is closed, thereby acting as a Faraday cage for the antenna and chip. The physics behind Faraday cages is well known in the art. It will be appreciated by those ordinarily skilled in the art that the shield need only be on a single page of the passport booklet. In a preferred embodiment, the shield is a conductive element resembling or attached to a passport page, e.g. 602 in (a) or 610 in (b). The shield may not be positioned together with the chip in the smart inlay, but may be positioned either between an external cover 604 and a page 606 as in (a), or between two pages 612 and 614 as in (b). Alternatively, the shield may incorporated in, or attached to the inside part of an external passport cover. The external cover incorporating the shield must be on the opposite side to the location of the chip and antenna, to allow the opening of the passport before placing it over the reader. Further alternatively, a shield 620 may be positioned externally to a passport with internal pages 616 a cover 618 and fashioned into any suitable shape as in (c). Such an external shield may be attached to or incorporated in a passport holder, e.g. a pouch or case carrying the passport. The shield may be made of any conductive material capable of providing shielding from electromagnetic radiation, for example a metal, a conductive polymer, a conductive composite, etc. Preferably, the shield may be formed into a shape such as a thin foil or mesh that does not significantly impact the feel and shape of the passport, its covers or its pages. Alternatively, the conductive material may be incorporated into the raw materials used in the smart passport fabrication.

Figure 7:
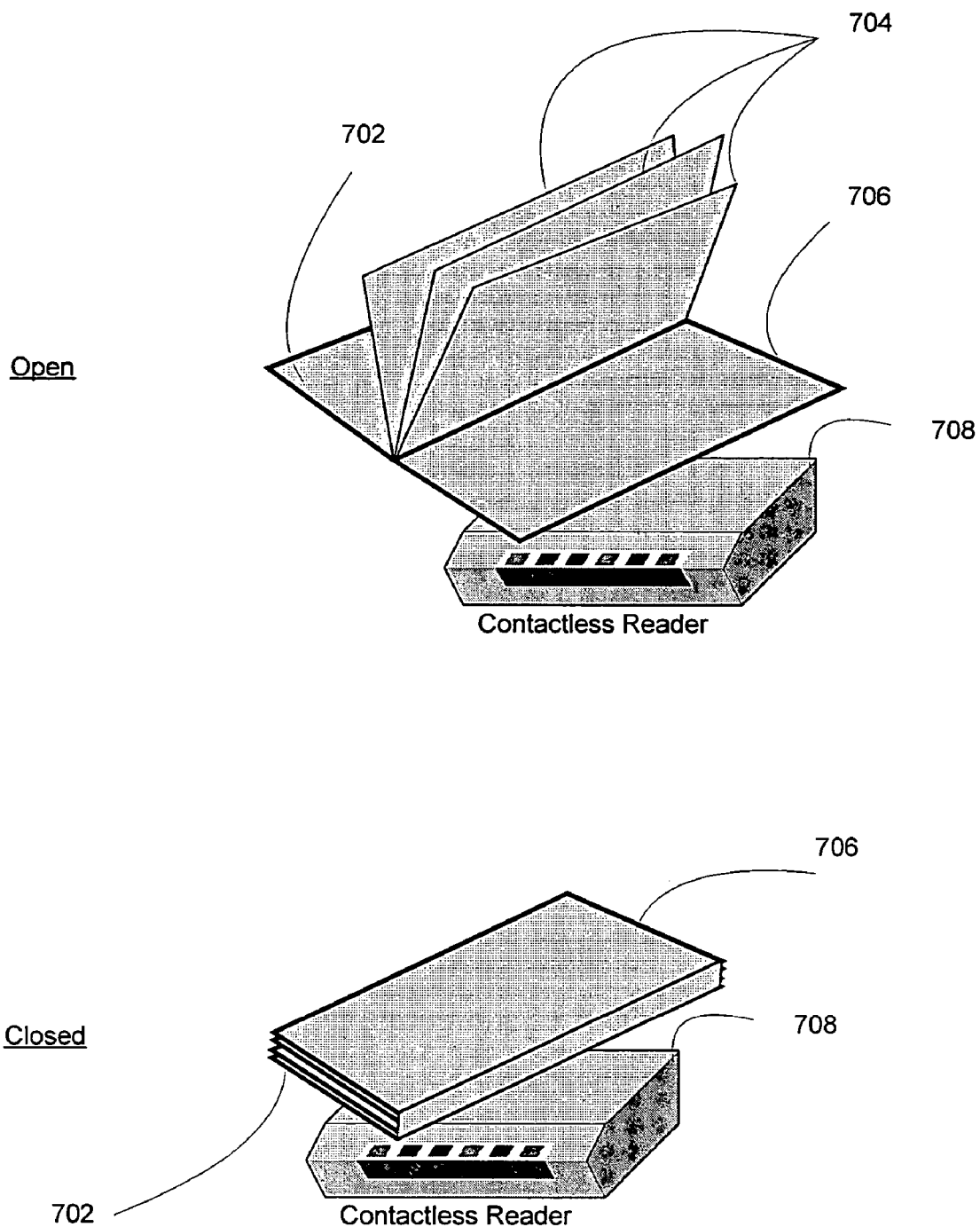
FIG. 7 shows a shielding element for use with the smart passport of the present invention when: (a) the passport is open and positioned over a contactless reader; (b) the passport is closed, with the shield preventing contactless reading of the information in the chip.

Reference is now made to FIG. 7, which shows a smart passport comprising a first external cover section 702 that includes a shield (not shown), a plurality of pages 704 and a second cover section 706. In (a), the passport is open and positioned over a contactless reader 708 such that the shield in cover 702 does not prevent communications between the reader and the chip in the smart inlay. In (b), the passport is closed, with the shield preventing contactless reading of the information in the chip. If the shield is incorporated internally, between two pages or between a page and a cover, the action would be the same: when open, the passport is positioned such that the contactless reader can read it. When closed, the shield prevents information theft.

Figure 8A:
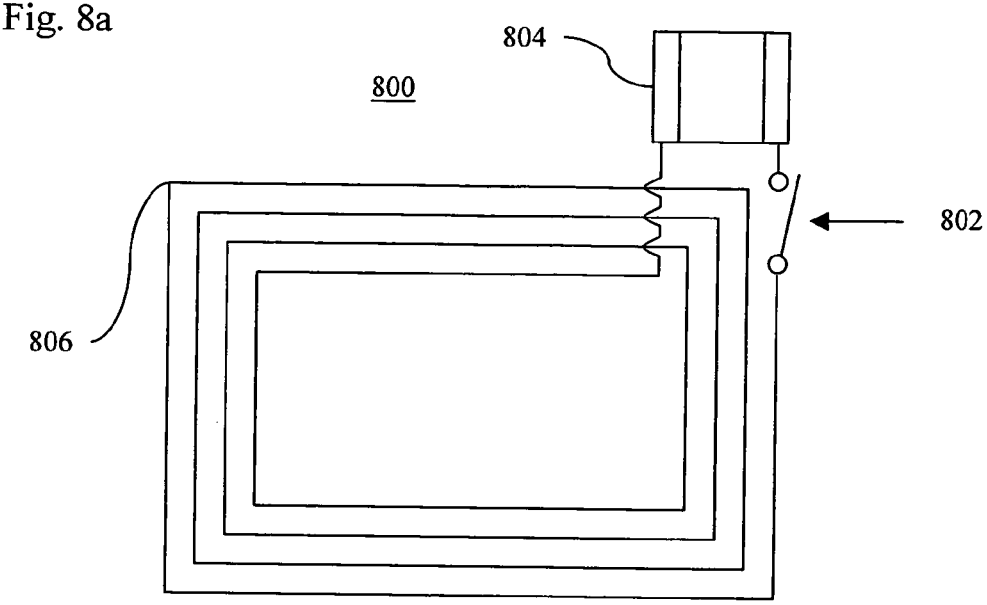
FIG. 8a is a schematic view of a smart identification module having a switching arrangement for use with the smart passport of the present invention.
Figure 8B:
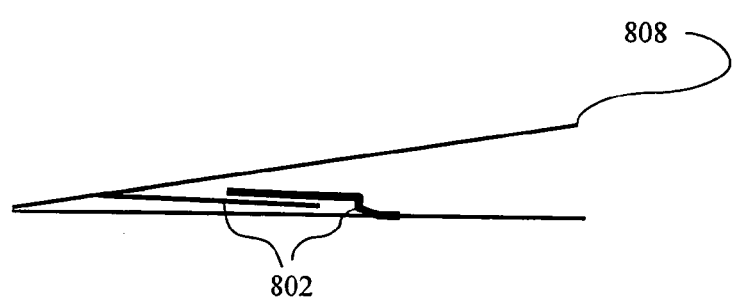
FIG. 8b is a schematic view of the switching arrangement of FIG. 8a when the smart passport is closed.
Figure 8C:
FIG. 8c is a schematic view of the switching arrangement of FIG. 8a when the smart passport is open.

Reference is now made to FIGS. 8*a* to 8*c*. FIG. 8*a* is a schematic view of a smart identification module 800 having a switching arrangement 802 for use with the smart passport of the present invention. FIG. 8*b* is a schematic view of switching arrangement 802 of FIG. 8*a* when the smart passport is closed. FIG. 8*c* is a schematic view of switching arrangement 802 of FIG. 8*a* when the smart passport is open. Smart identification module 800 includes a contactless chip module 804 and antenna 806. Smart identification module 800 is operative to store and exchange personal identification information contactlessly with an external reader. Smart identification module 800 is disposed on at least one of the pages of a passport booklet 808 using one of the methods described herein above with reference to FIGS. 1-5. Switching arrangement 802 forms part of an anti-skimming element for preventing unauthorized theft of the information stored on contactless chip module 804. Switching arrangement 802 is electrically connected to contactless chip module 804 and antenna 806 acting as a circuit breaker for selectively enabling and disabling transmission of the information stored in contactless chip module 804. Switching arrangement 802 is disposed so as to break the contact between contactless chip module 804 and antenna 806. It will be appreciated by those ordinarily skilled in the art that switching arrangement 802 can be disposed to break the continuity of antenna 806 thereby enabling/disabling antenna 806. Additionally, It will be appreciated by those ordinarily skilled in the art that switching arrangement 802 can be disposed so as to enable/disable output from contactless chip module 804, as will be described with reference to FIG. 9*b*. Switching arrangement 802 is a mechanical switch typically disposed in the cover of passport booklet 808, such that, when passport booklet 808 is closed, switching arrangement 802 disables transmission of the information by contactless chip module 804 and when passport booklet 808 is open more than a threshold angle, switching arrangement 802 enables transmission of the information by contactless chip module 804. The term "sufficiently open" is defined herein as being open enough so as to actuate the switch. It will be appreciated by those ordinarily skilled in the art that when the circuit is "broken" by switching arrangement 802, contactless chip module 804 can neither receive nor transmit data. Similarly, when the circuit is "closed" by switching arrangement 802, contactless chip module 804 can receive and transmit data. Switching arrangement 802 typically includes two conducting sections which make contact when passport booklet 808 is opened. Switches similar to switching arrangement 802 are used in novelty greeting cards, which play a tune when the card is opened.

Figure 9A:
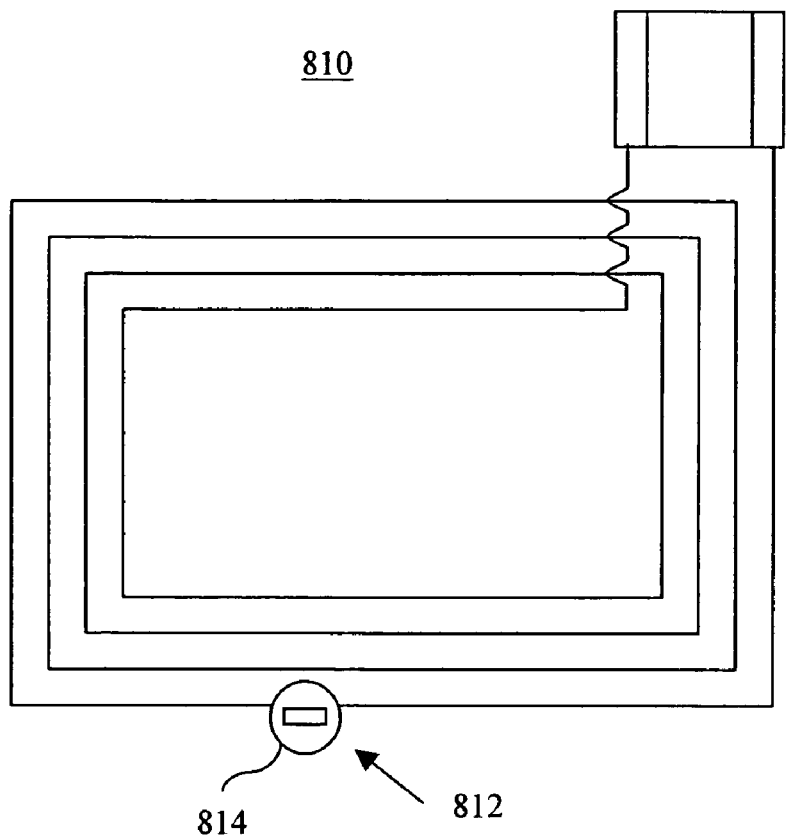
FIG. 9a is a schematic view of a smart identification module having a light sensing switching arrangement for use with the smart passport of the present invention.

Reference is now made to FIG. 9a, which is a schematic view of a smart identification module 810 having a light sensing switching arrangement 812 for use with the smart passport of the present invention. Light sensing switching arrangement 812 includes a light sensor 814 configured such that, when light sensor 814 is exposed to light above a threshold light level, light sensing switching arrangement 812 enables transmission and receiving of information by smart identification module 810. Similarly, when the light incident on light sensor 814 drops below a threshold light level, light sensing switching arrangement 812 disables transmission and receiving of information by smart identification module 810. Light sensor 814 is typically disposed on an inner face of a cover page or as part of smart identification module 810 so that when the smart passport is opened to the page including smart identification module 810, communication is enabled and when the smart passport is closed the communication is disabled. As a practical matter, the passport reader typically includes a light source in order to ensure that light sensor 814 receives enough light during reading of the smart passport by the passport reader. Therefore, light sensor 814 is disposed so that light sensor 814 faces the light source of the reader when the smart passport is placed over the reader. The term "light" is defined herein to include any radiation between infrared and UV. In order to increase security, light sensor 814 is preferably a non-visible light sensor or a sensor of a discrete frequency of radiation and the passport reader has a similar non-visible source (e.g. Infrared source) or a discrete frequency source (e.g. a laser), respectively. Therefore, simply opening the passport does not render the passport enabled for communication until light sensor 814 is exposed to the source of the reader.

Figure 9B:
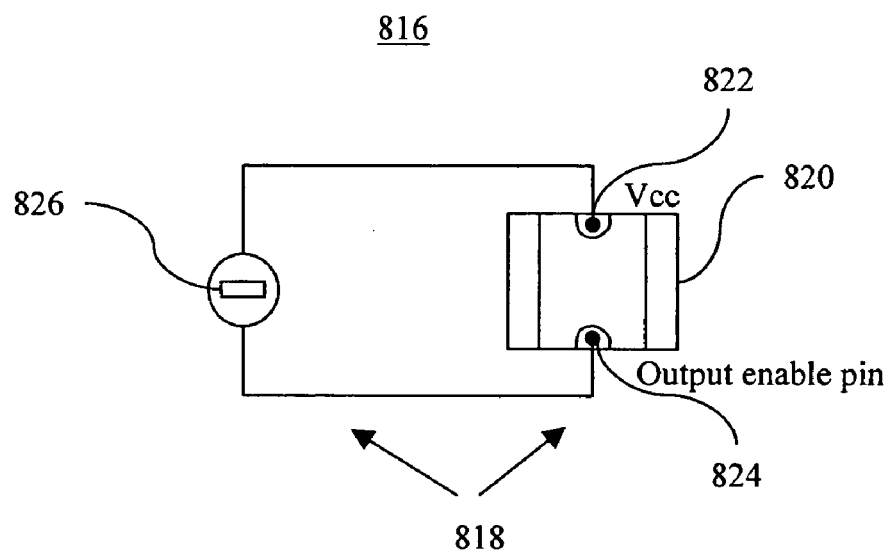
FIG. 9b is a schematic view of an alternate smart identification module having a light sensing switching arrangement for use with the smart passport of the present invention.

Reference is now made to FIG. 9b, which is a schematic view of an alternate smart identification module 816 having a light sensing switching arrangement 818 for use with the smart passport of the present invention. Light sensing switching arrangement 818 includes a light sensor 826. Smart identification module 816 includes a chip module 820. Chip module 820 has a power supply voltage input pin 822 and an output enable pin 824 or equivalent functionality pins. Light sensor 826 is electrically connected to power supply voltage input pin 822 and output enable pin 824 so that light incident on light sensor 826 selectively enables and disables the output of chip module 820.

Figure 10A:
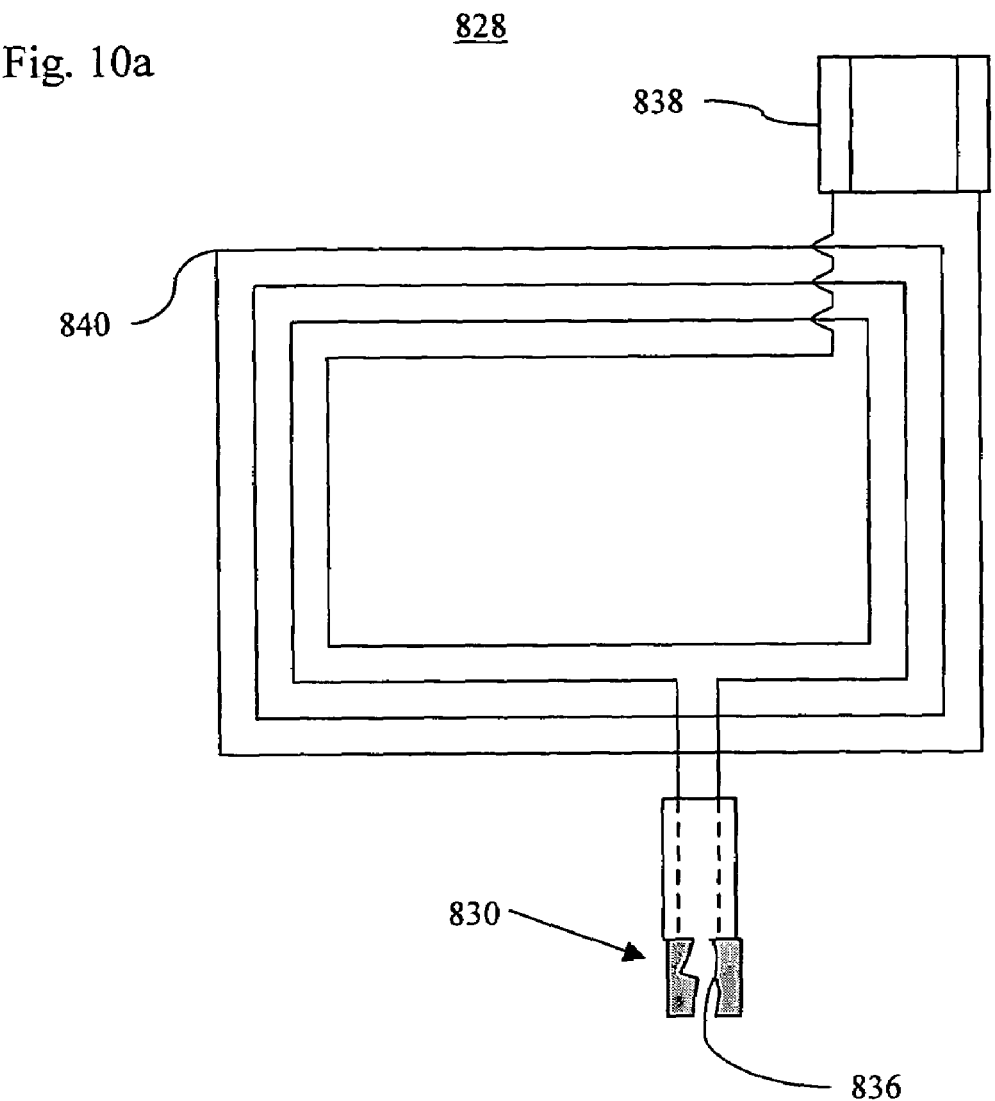
FIG. 10a is a schematic view of a smart identification module having a key operated switching arrangement for use with the smart passport of the present invention.
Figure 10B:
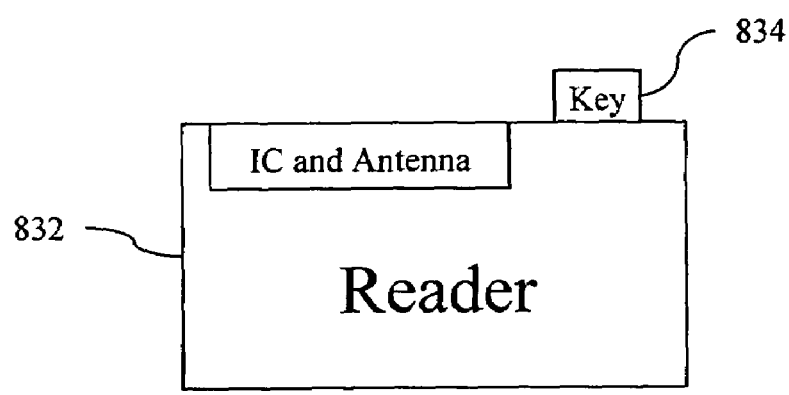

Reference is now made to FIGS. 10a and 10b. FIG. 10a is a schematic view of a smart identification module 828 having a key operated switching arrangement 830 for use with the smart passport of the present invention. FIG. 10b is a schematic view of a passport reader 832 for use with smart identification module 828 of FIG. 10a. Smart identification module 828 includes a chip module 838 and an antenna 840. Key operated switching arrangement 830 is disposed in antenna 840. Key operated switching arrangement 830 is configured for breaking the continuity of antenna 840 thereby preventing antenna 840 from transmitting or receiving data. Key operated switching arrangement 830 is configured for actuation by an external key. The term "external key" is defined herein as a physical key which is not permanently mechanically connected to key operated switching arrangement 830. Passport reader 832 includes a protrusion 834 for actuating key operated switching arrangement 830 so as to close the antenna loop thereby enabling antenna 840 to transmit and receive data. Protrusion 834 is preferably a key, which is shaped for insertion into a receiving opening 836 of key operated switching arrangement 830. Protrusion 834 typically includes an electrically conducting layer which closes the loop of antenna 840. Therefore, the smart passport is only readable when an appropriate key is inserted into key operated switching arrangement 830. It will be appreciated by those ordinarily skilled in the art that instead of using protrusion 834, key operated switching arrangement 830 can be operated using a hand-held key which is operated by a human operator, for example, but not limited to a border control officer.

Figure 11:
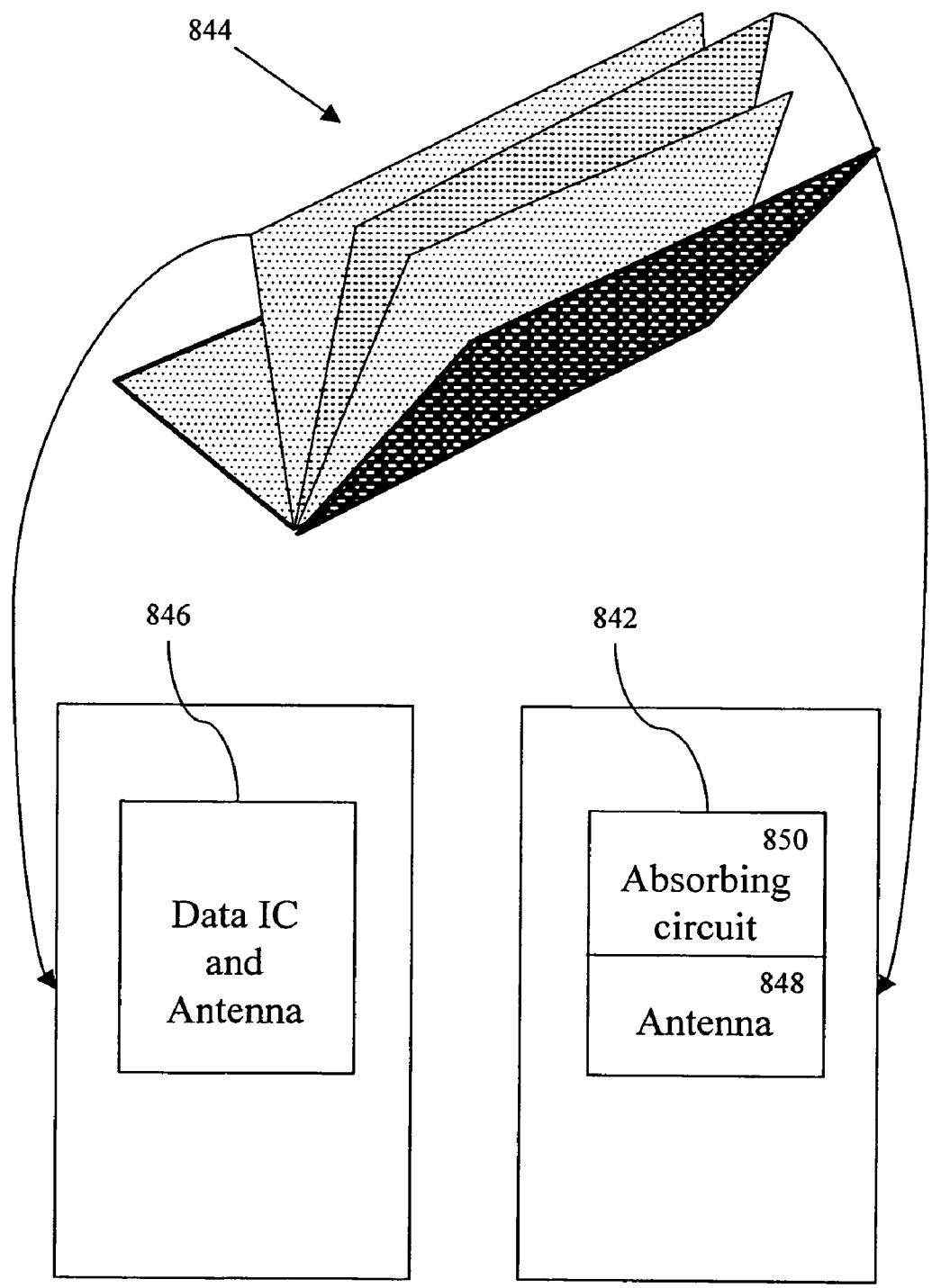
FIG. 11 is a schematic view of an electronic absorbing element for use with the smart passport of the present invention.

Reference is now made to FIG. 11, which is a schematic view of an electronic absorbing element 842 for use with the smart passport of the present invention. Electronic absorbing element 842 is typically disposed in a page of a smart passport 844 adjacent to a smart identification module 846. Electronic absorbing element 842 is an anti-skimming element which is configured for obstructing propagation of electromagnetic waves between smart identification module 846 and any external reader when smart passport 844 is closed, as will be described in more detail below. When smart passport 844 is open and smart identification module 846 is placed close to the passport reader (smart identification module 846 no longer being adjacent to electronic absorbing element 842), the obstructing effect of electronic absorbing element 842 is considerably reduced and does not affect communication between smart identification module 846 and a passport reader. Electronic absorbing element 842 includes an antenna 848 electrically connected to a circuit 850. Antenna 848 receives electromagnetic radiation transmitted by smart identification module 846 or by any external reader. Circuit 850 is a self-tuning resonating circuit or adaptive absorbing circuit. Circuit 850 self tunes to the frequency of the received electromagnetic radiation and resonates, thereby acting as an efficient energy absorber of the electromagnetic radiation. Therefore, circuit 850 obstructs propagation of electromagnetic waves between smart identification module 846 and any external reader when smart passport 844 is closed. Those skilled in the art of electrical engineering know how to construct a suitable self-tuning resonating circuit. It will be appreciated by those ordinarily skilled in the art that electronic absorbing element 842 can be disposed in a holder (not shown) of smart passport 844. It will be appreciated by those ordinarily skilled in the art that an electronic absorbing element having a natural frequency which is not the same as the frequency of communication of smart identification module 846 can still have a significant absorbing effect and therefore be used to form an effective electronic absorbing element 842.

Figure 12:
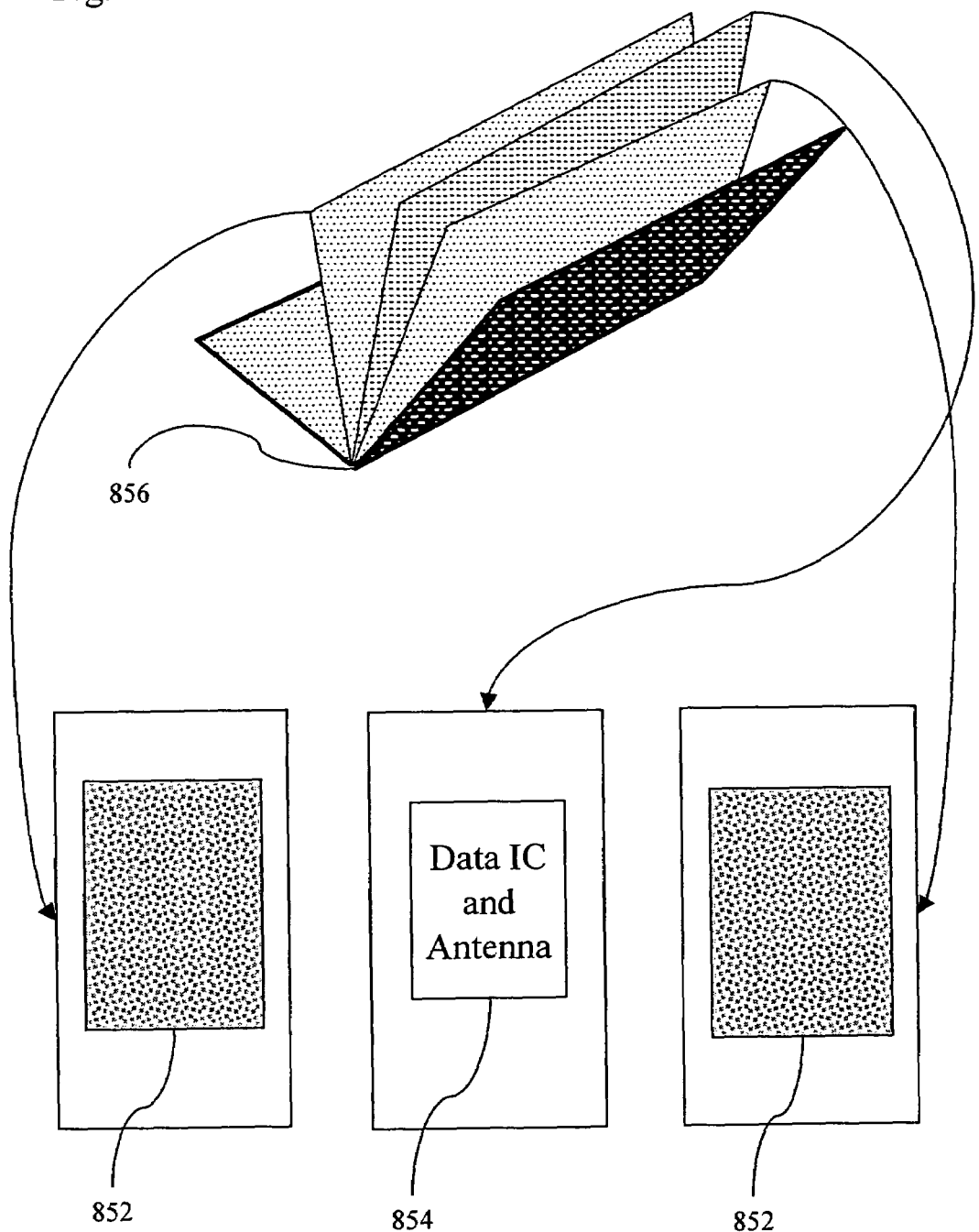
FIG. 12 is a schematic view of a magnetic absorbing element for use with the smart passport of the present invention.

Reference is now made to FIG. 12, which is a schematic view of a magnetic absorbing element 852 for use with the smart passport of the present invention. Magnetic absorbing element 852 operates in a similar manner to electronic absorbing element 842 of FIG. 11. Magnetic absorbing element 852 is typically disposed in two pages of a smart passport 856 sandwiching smart identification module 854 between the two pages including magnetic absorbing element 852. However, it will be appreciated by those ordinarily skilled in the art that magnetic absorbing element 852 can be disposed on a single page of smart passport 856. Magnetic absorbing element 852 includes a magnetic material, typically ferrite dust, which has a natural frequency as close as possible to the communicating frequency of smart identification module 854. Therefore, magnetic absorbing element 852 resonates when electromagnetic radiation has the same frequency as the natural frequency of magnetic absorbing element 852 is incident on magnetic absorbing element 852. Therefore, magnetic absorbing element 852 absorbs incident radiation having a frequency substantially the same as the communicating frequency of smart identification module 854 thereby preventing smart identification module 854 transmitting or receiving data when magnetic absorbing element 852 is adjacent to smart identification module 854. However, when smart passport 856 is open and smart identification module 854 is placed close to the passport reader (smart identification module 854 no longer being adjacent to magnetic absorbing element 852), the obstructing effect of magnetic absorbing element 852 is considerably reduced and does not affect communication between smart identification module 854 and a passport reader. Magnetic absorbing element 852 is typically formed as a foil, printed region, lacquer or self-adhesive magnetic strip, which is be easily attached to smart passport 856 or a passport holder. It will be appreciated by those ordinarily skilled in the art that there are many options for forming magnetic absorbing element 852. It will be appreciated by those ordinarily skilled in the art that a magnetic absorbing element having a natural frequency which is not the same as the frequency of communication of smart identification module 854 can still have a significant absorbing effect and therefore be used to form an effective magnetic absorbing element 852.

Figure 13:
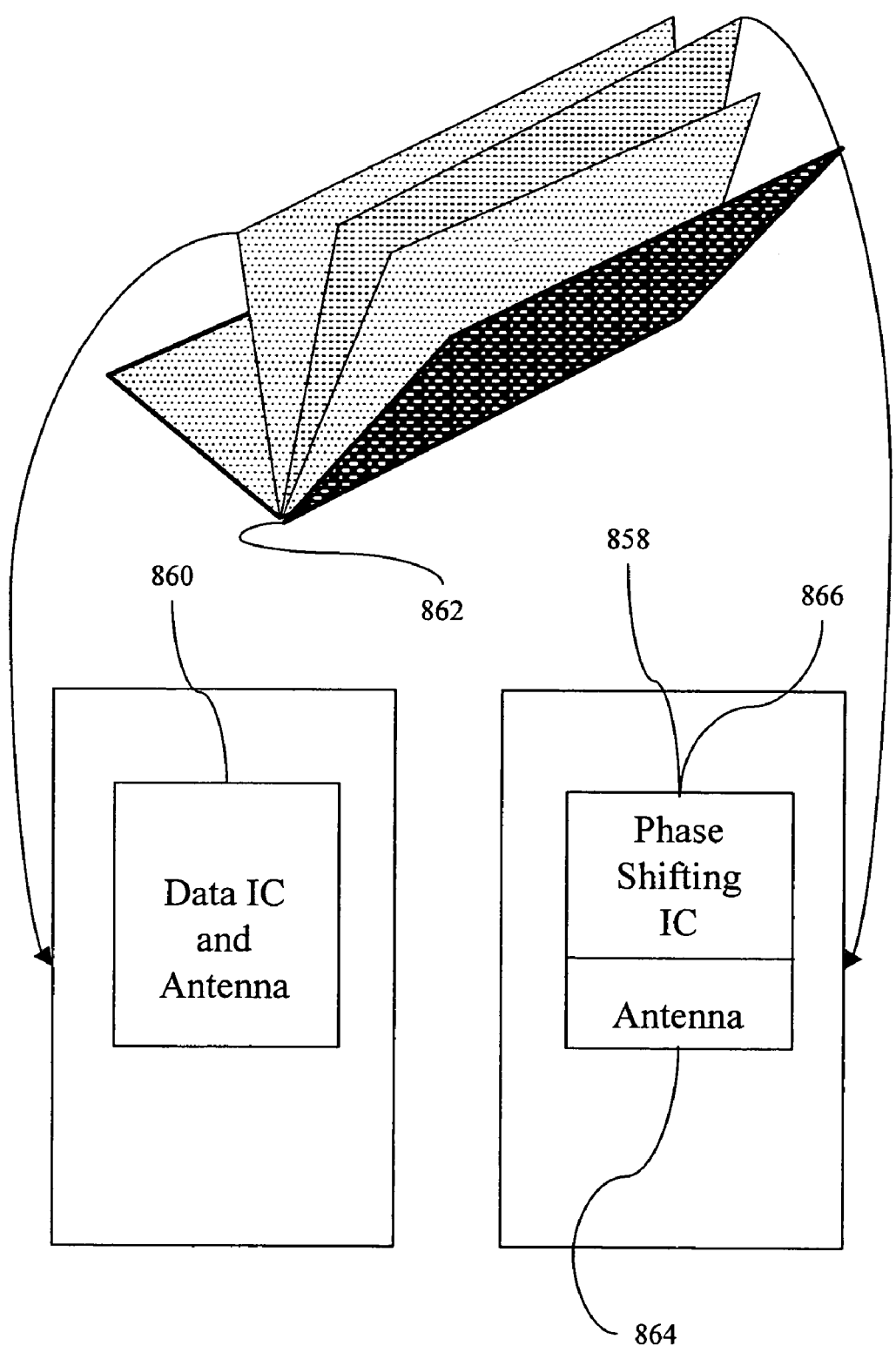
FIG. 13 is a schematic view of a phase shifting electronic element for use with the smart passport of the present invention.

Reference is now made to FIG. 13, which is a schematic view of a phase shifting electronic element 858 for use with the smart passport of the present invention. Phase shifting electronic element 858 is an anti-skimming element configured for transmitting a signal which is out-of-phase with electromagnetic waves transmitted or received by a smart identification module 860 of a smart passport 862. Therefore, phase shifting electronic element 858 generates noise and/or generates interference with the electromagnetic waves transmitted or received by smart identification module 860. Phase shifting electronic element 858 includes an antenna 864 and a circuit 866. Antenna 864 receives the electromagnetic radiation. Circuit 866 typically shifts the phase of the received signal by 180 degrees. However, it will be appreciated by those ordinarily skilled in the art that other phase-shifts will create interference or noise and therefore obstruct communication between smart identification module 860 and an external reader. Antenna 864 retransmits the signal thereby interfering with the original transmission to and from smart identification module 860. This concept is known in the use of radar blocking systems. It is known by one ordinarily skilled in the art how to construct a suitable phase-shifting circuit. When smart passport 862 is open and smart identification module 860 is placed close to the passport reader, the effect of phase shifting electronic element 858 is considerably reduced and does not affect communication between smart identification module 860 and the passport reader.

FIG. 14 is a schematic view of a passport information processing system 868 that is constructed and operable in accordance with a preferred embodiment of the present invention. Passport information processing system 868 is configured for processing information of a smart passport. Passport information processing system 868 includes a passport reader 870 and a processing terminal 872. Passport reader 870 and processing terminal 872 are operationally linked via a communication link 874. Passport reader 870 is configured for contactlessly reading the information from the smart passport. Passport reader 870 includes an encoder/decoder 876 having a security authorization module (SAM) card slot 878 for receiving a security authorization module (SAM) card 880. The use of SAM cards is known in the art of data terminal security. Encoder/decoder 876 is configured for generating encoded data from the information read from the smart passport as well as decoding commands and other data received from processing terminal 872. The term "encoding" is defined herein to include encrypting. The term "decoding" is defined herein to include "decrypting". Various encoding and encryption techniques are known to those skilled in the art of encryption. Passport reader 870 is configured for sending encoded data to processing terminal 872 via communication link 874. Passport reader 870 is also configured for receiving encoded data from processing terminal 872. Processing terminal 872 also includes an encoder/decoder 882 for encoding commands and other data for sending to passport reader 870 as well as decoding information received from passport reader 870. Therefore, all data transmitted between processing terminal 872 and passport reader 870 is encoded. The term "transmitted between" is defined herein to include transmitting data from each device to the other device. Processing terminal 872 is configured for processing the decoded data, for example, but not limited to validation and verification of the passport information against a database of passport details. Encoder/decoder 882 includes a security authorization module (SAM) card slot 884 for receiving a security authorization module (SAM) card 886. Encoder/decoder 882 has a random dynamically changing encryption key, which typically changes every 10 seconds in order to prevent identifying the key by an unauthorized reader.

Figure 15A:
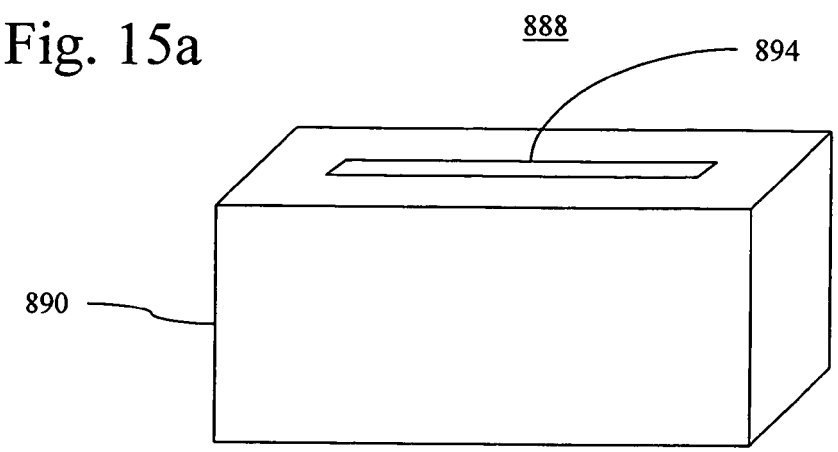
FIG. 15a is a schematic isometric view of a passport reader that is constructed and operable in accordance with a preferred embodiment of the present invention.
Figure 15B:
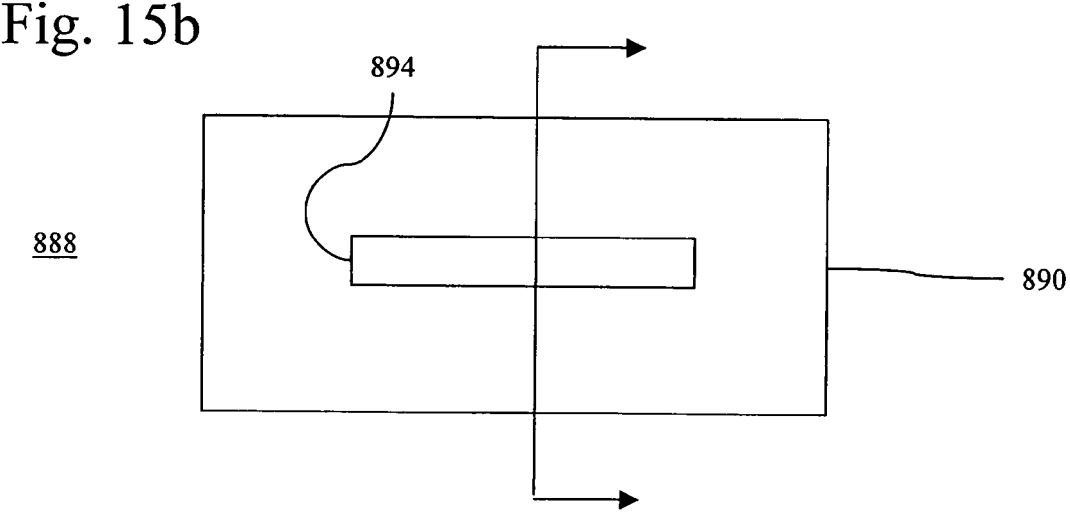
Figure 15C:
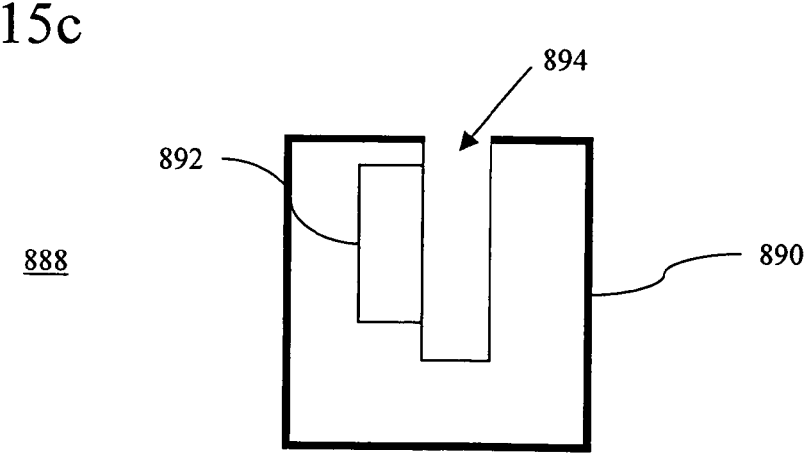
FIG. 15c is a cross-sectional view along line A-A of FIG. 15b.

Reference is now made to FIGS. 15*a* to 15*c*. FIG. 15*a* is a schematic isometric view of a passport reader 888 that is constructed and operable in accordance with a preferred embodiment of the present invention. FIG. 15*b* is a plan view of passport reader 888 of FIG. 15*a*. FIG. 15*c* is a cross-sectional view along line A-A of FIG. 15*b*. By way of introduction, the anti-skimming elements described above with reference to FIGS. 6 to 13 protect the smart passport when closed. However, it is also important to prevent skimming by an unauthorized reader when the passport is open during reading by an authorized passport reader. Passport reader 888 is configured for reading information from a smart passport. Passport reader 888 has a housing 890 and a contactless reading element 892. Reading element 892 is configured for contactlessly reading the information from the smart identification module of the smart passport. Reading element 892 is disposed in housing 890. Housing 890 has an opening 894 therein for inserting the smart identification module of the smart passport into housing 890 for reading by reading element 892. Housing 890 is configured as a faraday cage thereby preventing unauthorized theft of the information stored in the smart identification module while the passport is open.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art which would occur to persons skilled in the art upon reading the foregoing description.

What is claimed is:

1. A smart electronic personal identification document, comprising:
   (a) a smart identification module including a contactless chip module and an antenna, said smart identification module being operative to store and exchange personal identification information contactlessly with an external reader; and
   (b) an anti-skimming element for disposing adjacent to said smart identification module, said anti-skimming element being configured for preventing unauthorized theft of said information, wherein said anti-skimming element includes a switching arrangement electrically connected to said smart identification module, said switching arrangement being configured for selectively enabling and disabling transmission of said information by said smart identification module, said switching arrangement including a light sensor configured such that, when said light sensor is exposed to light above a threshold light level, said switching arrangement enables transmission of said information by said smart identification module.

2. The document of claim 1, wherein said chip module has a power supply voltage input pin and an output enable pin, said light sensor being electrically connected to said power supply voltage input pin and said output enable pin so that light incident on said light sensor selectively enables and disables the output of said chip module.

3. A smart inlay comprising:
   a. a core substrate operative to store and exchange information contactlessly with an external reader, said core substrate further conditioned to bind to a smart electronic personal identification document surface;
   b. at least one physical security component coupled to said core substrate and operative to render the smart inlay tamper-proof, wherein said at least one physical security component is selected from the group consisting of at least one tear line and at least one thermo-set patterned adhesive; and
   c. a logical security component incorporated in said core substrate and operative to render the smart inlay forgery-proof.

4. The smart inlay of claim 3, wherein said at least one thermo-set patterned adhesive includes two thermo-set patterned adhesives forming a composite adhesive structure.

5. A smart electronic personal identification document comprising:
   a. a booklet; and
   b. a smart inlay incorporated in said booklet, said smart inlay further including:
      i. a core substrate operative to store and exchange information contactlessly with an external reader, said core substrate further conditioned to bind to a passport surface,
      ii. at least one physical security component coupled to said core substrate and operative to render the smart inlay tamper-proof, wherein said at least one physical security component is selected from the group consisting of at least one tear line and at least one thermo-set patterned adhesive and
      iii. a logical security component incorporated in said core substrate and operative to render the smart inlay forgery-proof,
   whereby said smart inlay provides tamper-proof and forgery-proof properties to the document.

6. The smart electronic personal identification document of claim 5, wherein said at least one thermo-set patterned adhesive includes two thermo-set patterned adhesives forming a composite adhesive structure.

7. A method for tamper-proofing and forgery-proofing a smart electronic personal identification document comprising the steps of:
   a. providing a smart inlay operative to uniquely identify an authorized bearer of the document, said smart inlay adaptively fitting into the document, said smart inlay including:
      i. a core substrate operative to store and exchange information contactlessly with an external reader, said core substrate further conditioned to bind to a document surface,
      ii. at least one physical security component coupled to said core substrate and operative to render said smart inlay tamper-proof, and
      iii. a logical security component incorporated in said core substrate and operative to render said smart inlay forgery-proof; and
   b. attaching said smart inlay to said document.

8. The method of claim 7, wherein said providing at least one thermo-set patterned adhesive includes providing two thermo-set patterned adhesives forming a composite adhesive structure positioned to hold both the chip and the antenna.

* * * * *